(12) United States Patent
Baillie et al.

(10) Patent No.: US 12,428,502 B2
(45) Date of Patent: Sep. 30, 2025

(54) CATALYST SYSTEMS AND PROCESSES FOR PRODUCING POLYETHYLENE USING THE SAME

(71) Applicant: Dow Global Technologies LLC, Midland, MI (US)

(72) Inventors: Rhett A. Baillie, Lake Jackson, TX (US); Hien Q. Do, Lake Jackson, TX (US); David M. Pearson, Lake Jackson, TX (US); Johnathan E. Delorbe, Lake Jackson, TX (US); Andrew M. Camelio, Midland, MI (US); Philip P. Fontaine, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 499 days.

(21) Appl. No.: 18/000,038

(22) PCT Filed: May 28, 2021

(86) PCT No.: PCT/US2021/034868
§ 371 (c)(1),
(2) Date: Nov. 28, 2022

(87) PCT Pub. No.: WO2021/243214
PCT Pub. Date: Dec. 2, 2021

(65) Prior Publication Data
US 2023/0235099 A1    Jul. 27, 2023

Related U.S. Application Data

(60) Provisional application No. 63/143,324, filed on Jan. 29, 2021, provisional application No. 63/143,333, (Continued)

(51) Int. Cl.
C08F 4/646    (2006.01)
C08F 2/34     (2006.01)
(Continued)

(52) U.S. Cl.
CPC .............. *C08F 4/6465* (2013.01); *C08F 2/34* (2013.01); *C08F 4/02* (2013.01); *C08F 4/65912* (2013.01);
(Continued)

(58) Field of Classification Search
None
See application file for complete search history.

(56) References Cited

U.S. PATENT DOCUMENTS

| 3,709,853 A | 1/1973 | Karapinka |
| 4,003,712 A | 1/1977 | Miller |

(Continued)

FOREIGN PATENT DOCUMENTS

| CN | 109476783 A | 3/2019 |
| CN | 110461890 A | 11/2019 |

(Continued)

OTHER PUBLICATIONS

Chinese Office Action dated Jul. 24, 2024, pertaining to CN Patent Application No. 202180037924.7, 18 pgs.
(Continued)

*Primary Examiner* — John J Figueroa
(74) *Attorney, Agent, or Firm* — Dinsmore & Shohl LLP

(57) ABSTRACT

Embodiments of the present application are directed to procatalysts, and catalyst systems including procatalysts, including a metal-ligand complex having the structure of formula (I):

(Continued)

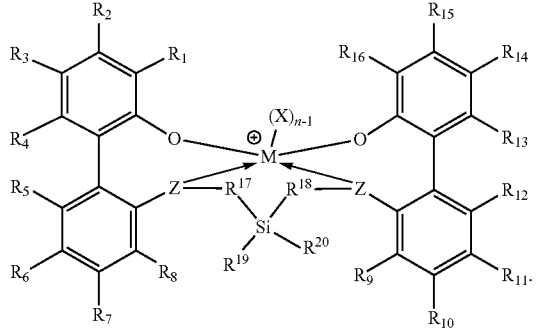

(I)

17 Claims, 4 Drawing Sheets

Related U.S. Application Data filed on Jan. 29, 2021, provisional application No. 63/031,638, filed on May 29, 2020.

(51) Int. Cl.
| | | |
|---|---|---|
| C08F 4/02 | (2006.01) | |
| C08F 4/659 | (2006.01) | |
| C08F 210/02 | (2006.01) | |
| C08F 210/16 | (2006.01) | |
| C08K 5/56 | (2006.01) | |

(52) U.S. Cl.
CPC ........ *C08F 4/65916* (2013.01); *C08F 210/02* (2013.01); *C08F 210/16* (2013.01); *C08K 5/56* (2013.01); *C08F 2410/00* (2013.01)

(56) References Cited

U.S. PATENT DOCUMENTS

| | | | |
|---|---|---|---|
| 4,011,382 A | 3/1977 | Levine et al. | |
| 4,302,566 A | 11/1981 | Karol et al. | |
| 4,543,399 A | 9/1985 | Jenkins, III et al. | |
| 4,665,208 A | 5/1987 | Welborn, Jr. et al. | |
| 4,874,734 A | 10/1989 | Kioka et al. | |
| 4,882,400 A | 11/1989 | Dumain et al. | |
| 4,908,463 A | 3/1990 | Bottelberghe | |
| 4,924,018 A | 5/1990 | Bottelberghe | |
| 4,952,540 A | 8/1990 | Kioka et al. | |
| 4,968,827 A | 11/1990 | Davis | |
| 5,041,584 A | 8/1991 | Crapo et al. | |
| 5,091,352 A | 2/1992 | Kioka et al. | |
| 5,103,031 A | 4/1992 | Smith, Jr. | |
| 5,157,137 A | 10/1992 | Sangokoya | |
| 5,204,419 A | 4/1993 | Tsutsui et al. | |
| 5,206,199 A | 4/1993 | Kioka et al. | |
| 5,235,081 A | 8/1993 | Sangokoya | |
| 5,248,801 A | 9/1993 | Sangokoya | |
| 5,329,032 A | 7/1994 | Tran et al. | |
| 5,352,749 A | 10/1994 | DeChellis et al. | |
| 5,541,270 A | 7/1996 | Chinh et al. | |
| 5,665,818 A | 9/1997 | Tilston et al. | |
| 5,677,375 A | 10/1997 | Rifi et al. | |
| 5,965,477 A | 10/1999 | Sivaram et al. | |
| 5,972,510 A | 10/1999 | O'Hare et al. | |
| 6,034,187 A | 3/2000 | Maehama et al. | |
| 6,472,484 B1 | 10/2002 | Abe et al. | |
| 9,029,487 B2 | 5/2015 | Klosin et al. | |
| 9,234,060 B2 * | 1/2016 | Kao ....................... | B01J 31/143 |
| 2008/0071046 A1 | 3/2008 | Leclerc et al. | |
| 2015/0166699 A1 | 6/2015 | Kao et al. | |
| 2016/0340454 A1 * | 11/2016 | Funk ........................ | C08F 2/34 |
| 2017/0008444 A1 | 1/2017 | Bopp et al. | |
| 2020/0247917 A1 * | 8/2020 | Do ........................... | C08F 2/38 |
| 2021/0070902 A1 * | 3/2021 | Liu ....................... | B29C 48/0018 |
| 2021/0261703 A1 * | 8/2021 | Liu ........................ | C08F 210/16 |
| 2021/0380737 A1 * | 12/2021 | Mure ..................... | C08F 210/16 |
| 2023/0287159 A1 * | 9/2023 | Baillie ................. | C08F 210/02 |

FOREIGN PATENT DOCUMENTS

| | | |
|---|---|---|
| CN | 110691797 A | 1/2020 |
| EP | 0279586 B1 | 5/1994 |
| EP | 0517868 B1 | 11/1995 |
| EP | 0516476 B1 | 10/1997 |
| EP | 0511665 B1 | 7/1998 |
| EP | 0594218 B1 | 3/1999 |
| EP | 0767184 B1 | 8/1999 |
| EP | 0561476 B1 | 9/1999 |
| EP | 0802202 B1 | 10/1999 |
| EP | 0794200 B1 | 7/2000 |
| WO | 1994010180 A1 | 5/1994 |
| WO | 1994047598 A1 | 9/1999 |
| WO | 1999048605 A1 | 9/1999 |
| WO | 1999050311 A1 | 10/1999 |
| WO | 1999060033 A1 | 11/1999 |
| WO | 2008033197 A2 | 3/2008 |
| WO | 2009064404 A2 | 5/2009 |
| WO | 2011146044 A1 | 11/2011 |
| WO | 2012027448 A1 | 1/2012 |
| WO | 2014105411 A1 | 7/2014 |
| WO | 2014105412 A1 | 7/2014 |
| WO | 2014105413 A1 | 7/2014 |
| WO | 2016003879 A1 | 1/2016 |
| WO | 2016089935 A1 | 9/2016 |
| WO | 2018022975 A1 | 2/2018 |
| WO | 2018183056 A1 | 10/2018 |

OTHER PUBLICATIONS

Chinese Office Action and Search Report dated Jan. 25, 2024, pertaining to CN Patent Application No. 202180037924.7, 17 pgs.
Chinese Office Action and Search Report dated Mar. 4, 2024, pertaining to CN Patent Application No. 202180037920.9, 20 pgs.
Chinese Office Action and Search Report dated Mar. 13, 2024, pertaining to CN Patent Application No. 202180037717.1, 16 pgs.
Chinese Office Action dated Jan. 17, 2024, pertaining to CN Patent Application No. 2021800380954, 14 pgs.
Chinese Office Action dated Jan. 13, 2025, pertaining to CN Patent Application No. 202180037924.7, 20 pgs.
Brazilian Technical Report dated Feb. 25, 2025, pertaining to BR Patent Application No. BR1120220238622, 8 pgs.
Brazilian Technical Report dated Feb. 25, 2025, pertaining to BR Patent Application No. BR1120220239050, 8 pgs.
Brazilian Technical Report dated Feb. 25, 2025, pertaining to BR Patent Application No. BR1120220238843, 8 pgs.
Brazilian Technical Report dated Feb. 28, 2025, pertaining to BR Patent Application No. BR1120220238738, 8 pgs.
Brazilian Technical Report dated Feb. 25, 2025, pertaining to BR Patent Application No. BR1120220240872, 8 pgs.
Chinese Office Action dated Sep. 30, 2024, pertaining to CN Patent Application No. 2021800377171, 16 pgs.
Chinese Office Action dated Oct. 14, 2024, pertaining to CN Patent Application No. 2021800379209, 8 pgs.
Chinese Office Action dated Dec. 31, 2024, pertaining to CN Patent Application No. 202180037717.1, 6 pgs.
International Search Report and Written Opinion dated Sep. 30, 2021, pertaining to Int'l Patent Application No. PCT/US2021/034866, 8 pgs.
International Search Report and Written Opinion dated Sep. 30, 2021, pertaining to Int'l Patent Application No. PCT/US2021/034878, 9 pgs.
International Search Report and Written Opinion dated Sep. 30, 2021, pertaining to Int'l Patent Application No. PCT/US2021/034868, 10 pgs.

(56) References Cited

OTHER PUBLICATIONS

International Search Report and Written Opinion dated Sep. 30, 2021, pertaining to Int'l Patent Application No. PCT/US2021/034864, 13 pgs.
International Search Report and Written Opinion dated Sep. 30, 2021, pertaining to Int'l Patent Application No. PCT/US2021/034871, 13 pgs.
Lee et al. "Toward Absolute Chemical Composition Distribution Measurement of Polyolefins by High-Temperature Liquid Chromatography Hyphenated with Infrared Absorbance and Light Scattering Detectors", Analytical Chemistry 2014 86 (17), 8649-8656.
Saudi Arabia Examination Report dated Oct. 9, 2023, pertaining to SA Patent Application No. 522441492, 15 pgs.
Saudi Arabia Substantive Examination Report dated Oct. 11, 2023, pertaining to SA Patent Application No. 522441511, 15 pgs.
Chinese Office Action dated Apr. 25, 2024, pertaining to CN Patent Application No. 202180037607.5, 16 pgs.
European Article 94(3) dated Jun. 5, 2024, pertaining to EP Patent Application No. 21735492.7, 5 pgs.
European Article 94(3) dated Jun. 5, 2024, pertaining to EP Patent Application No. 21735490.1, 6 pgs.
European Article 94(3) dated Jun. 5, 2024, pertaining to EP Patent Application No. 21742208.8, 5 pgs.
European Article 94(3) dated Jun. 5, 2024, pertaining to EP Patent Application No. 21735493.5, 5 pgs.

\* cited by examiner

CATALYST SYSTEMS AND PROCESSES FOR PRODUCING POLYETHYLENE USING THE SAME

CROSS REFERENCE TO RELATED APPLICATIONS

This application is a National Phase Entry under 35 U.S.C. § 371 of International Patent Application No. PCT/US2021/034868 filed May 28, 2021, which claims priority to U.S. Provisional Patent Application No. 63/031,638 filed May 29, 2020, U.S. Provisional Patent Application No. 63/143,324 filed Jan. 29, 2021, and U.S. Provisional Patent Application No. 63/143,333 filed Jan. 29, 2021, each of which is incorporated by reference in its entirety.

TECHNICAL FIELD

Embodiments of the present disclosure are generally directed to processes for producing polyethylene and, in particular, contacting ethylene and, optionally, one or more ($C_3$-$C_{12}$)α-olefin comonomers with silyl-bridged bis-phenylphenoxy catalyst systems in a gas-phase polymerization reactor.

BACKGROUND

Since the discovery of Ziegler and Natta on heterogeneous olefin polymerizations, global polyolefin production reached approximately 150 million tons per year in 2015, and continues to increase due to market demand. The catalyst systems in the polyolefin polymerization process may contribute to the characteristics and properties of such polyolefins. For example, catalyst systems that include bis-phenylphenoxy (BPP) metal-ligand complexes may produce polyolefins that have flat or reverse short-chain branching distributions (SCBD), relatively high levels of comonomer incorporation, high native molecular weights, and/or narrow-medium molecular weight distributions (MWD).

However, when utilized in some polymerization processes, such as gas-phase polymerization, catalyst systems that include BPP metal-ligand complexes may exhibit generally poor productivity. That is, catalyst systems that include BPP metal-ligand complexes may generally produce less polymer relative to the amount of the catalyst system used. Therefore, the use of catalyst systems that include BPP metal-ligand complexes may not be commercially viable in gas-phase polymerization processes.

SUMMARY

Accordingly, ongoing needs exist for catalyst systems that are suitable for use in gas-phase reactors and have improved productivity when utilized in gas-phase polymerization processes. Embodiments of the present disclosure address these needs by providing catalyst systems that may be utilized in gas-phase polymerization processes, exhibit a greatly increased productivity when compared to similar catalyst systems including BPP metal-ligand complexes without silicon-containing bridges.

Furthermore, ethylene-based copolymer (also called poly (ethylene-co-1-alkene)) resins generally have the short chain branching distribution (SCBD) or comonomer distribution. Many ethylene-based copolymers have a reverse SCBD or reverse comonomer distribution, in which the weight percent comonomer decreases as the molecular weight of the ethylene-based copolymer increases. However, producing copolymers with an increase in the weight percent (wt %) comonomer as the molecular weight (MW) of the polymer chains increases improves performances in many applications.

A reverse comonomer distribution is usually achieved using a dual reactor configuration and a single or dual catalyst process. In a dual reactor process a single catalyst can be used to make a high molecular weight, lower density component (having higher wt % comonomer) and a low molecular weight high density (lower wt % comonomer) component in separate reactors via independent process controls in the two reactors. The result is a bimodal resin that has a net reverse SCBD across the bimodal distribution. In the case of a dual catalyst single reactor process, one catalyst makes a high molecular weight low density component, while the other makes a low molecular weight high density component, resulting in a bimodal product having reverse SCBD.

Embodiments of this disclosure include processes for producing an ethylene-based copolymer having a reverse comonomer distribution. In embodiments, the process includes polymerizing ethylene and one or more ($C_3$-$C_{12}$) α-olefin comonomers in the presence of a catalyst system in a single gas-phase polymerization reactor at a reactor temperature of less than or equal to 150° C. and a molar feed ratio of less than or equal to 0.020 of the one or more ($C_3$-$C_{12}$)α-olefin comonomers to the ethylene, wherein: the catalyst system comprises an activated metal-ligand complex having a structure according to formula (Ia); and the ethylene-based copolymer has a unimodal molecular weight distribution as determined by gel permeation chromatography (GPC, e.g., conventional GPC) and a molecular weight comonomer distribution index of greater than 0 as determined by Rapid FT-IR spectroscopy on dissolved polymer of a GPC measurement.

In one or more embodiments, the catalyst system includes an activated metal-ligand complex disposed on one or more support materials. The activated metal-ligand complex has a structure according to formula (Ia):

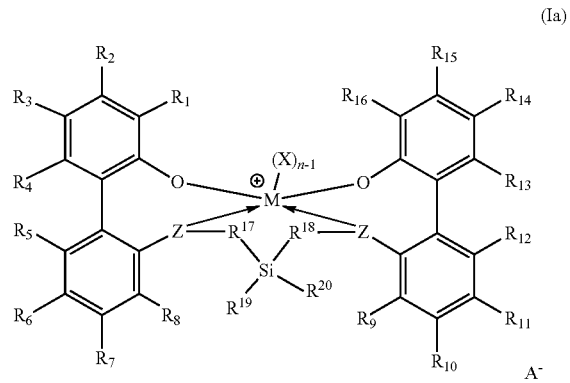

In formula (I), $A^-$ is an anion. M is titanium, zirconium, or hafnium; subscript n of $(X)_n$ is 1, 2, or 3; each X is a monodentate ligand independently chosen from unsaturated ($C_2$-$C_{50}$)hydrocarbon, unsaturated ($C_2$-$C_{50}$)heterohydrocarbon, ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, halogen, $-N(R^N)_2$, and $-N(R^N)COR^C$; and the metal-ligand complex of formula (I) is overall charge-neutral.

In formula (I), each Z is independently chosen from —O—, —S—, $(C_6\text{-}C_{50})$aryl, $(C_4\text{-}C_{50})$heteroaryl, $N(C_1\text{-}C_{40})$hydrocarbyl, and $P(C_1\text{-}C_{40})$hydrocarbyl.

In formula (I), $R^1$ and $R^{16}$ are independently chosen from $(C_6\text{-}C_{50})$aryl, $(C_4\text{-}C_{50})$heteroaryl, $(C_1\text{-}C_{40})$alkyl, $(C_3\text{-}C_{40})$heteroalkyl, radicals having formula (II), radicals having formula (III), and radicals having formula (IV):

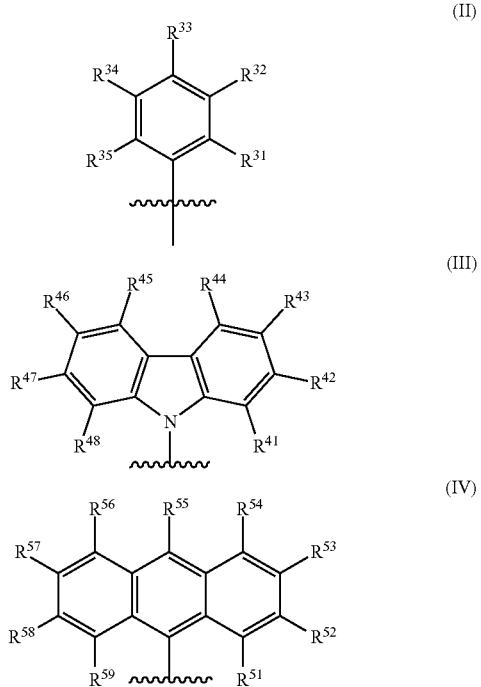

In formulas (II), (III), and (IV), $R^{31\text{-}35}$, $R^{41\text{-}48}$, and $R^{51\text{-}59}$ are independently chosen from —H, $(C_1\text{-}C_{50})$hydrocarbyl, $(C_1\text{-}C_{50})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N$(R^N)$—, $(R^C)_2$NC(O)—, or halogen.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1\text{-}C_{50})$hydrocarbyl, $(C_1\text{-}C_{50})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N(R)—, $(R^C)_2$NC(O)—, and halogen.

In formula (I), $R^{17}$ and $R^{18}$ are independently chosen from —(CR$^C_2)_m$—, wherein subscript m is from 1 to 10, and $R^C$ of —(CR$^C_2)_m$ is —H, $(C_1\text{-}C_{10})$alkyl.

In formula (I), $R^{19}$ and $R^{20}$ are independently chosen from linear or branched $(C_1\text{-}C_{20})$alkyl.

In formulas (I), (II), (III), and (IV), each $R^C$, $R^P$, and $R^N$ are independently chosen from —H, $(C_1\text{-}C_{50})$hydrocarbyl, and $(C_1\text{-}C_{50})$heterohydrocarbyl.

Embodiments of the present disclosure include methods for producing a catalyst system. The method includes contacting one or more support materials, one or more activators, and a metal-ligand complex in an inert hydrocarbon solvent to produce the catalyst system.

Embodiments of the present disclosure include a process for producing polyethylene. The process includes contacting ethylene and, optionally, one or more $(C_3\text{-}C_{12})$α-olefin comonomers with a catalyst system in a gas-phase polymerization reactor. The catalyst system comprises a metal-ligand complex disposed on one or more support materials.

DETAILED DESCRIPTION

Figure 1:
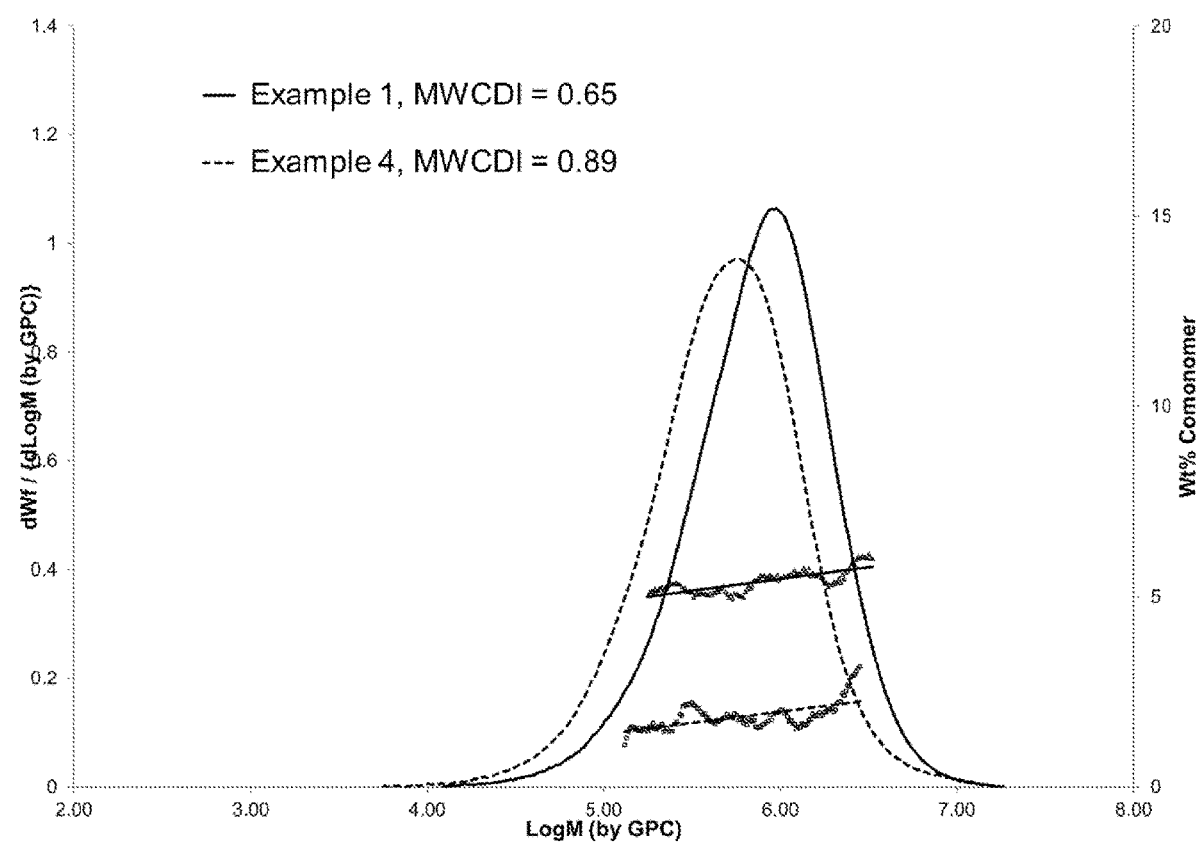
FIG. 1 is a graphical depiction of the reverse comonomer distributions and molecular weight distributions of inventive Examples 1 and 4.

Specific embodiments of procatalysts, catalyst systems, methods of producing catalyst systems, and processes for producing polyethylene will now be described. However, it should be understood that the systems, methods, and processes of the present disclosure may be embodied in different forms, and should not be construed as limited to the specific embodiments set forth in the present disclosure. Rather, embodiments are provided so that the present disclosure will be thorough and complete, and will fully convey the scope of the disclosed subject matter to those skilled in the art.

Common abbreviations used in the present disclosure are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; Et$_2$O: diethyl ether; CH$_2$Cl$_2$: dichloromethane; CV: column volume (used in column chromatography); EtOAc: ethyl acetate; C$_6$D$_6$: deuterated benzene or benzene-d6; CDCl$_3$: deuterated chloroform; Na$_2$SO$_4$: sodium sulfate; MgSO$_4$: magnesium sulfate; HCL: hydrogen chloride; n-BuLi: butyllithium; t-BuLi: tert-butyllithium; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days.

The terms "halogen atom" or "halogen" mean the radical of a fluorine atom (F), chlorine atom (Cl), bromine atom (Br), or iodine atom (I). The term "halide" means the anionic form of the halogen atom: fluoride (F$^-$), chloride (Cl$^-$), bromide (Br$^-$), or iodide (I$^-$).

The term "independently selected" means that the R groups, such as, $R^1$, $R^2$, and $R^3$, can be identical or different (e.g., $R^1$, $R^2$, and $R^3$ may all be substituted alkyls; or $R^1$ and $R^2$ may be a substituted alkyl, and $R^3$ may be an aryl). A chemical name associated with an R group is intended to convey the chemical structure that is recognized in the art as corresponding to that of the chemical name. As a result, chemical names are intended to supplement and illustrate, not preclude, the structural definitions known to those of skill in the art.

The term "procatalyst" means a compound that has catalytic activity when combined with an activator. The term "activator" means a compound that chemically reacts with a procatalyst in a manner that converts the procatalyst to a catalytically active compound. As used in the present disclosure, the terms "co-catalyst" and "activator" are interchangeable, and have identical meanings unless clearly specified.

The term "substitution" means that at least one hydrogen atom (—H) bonded to a carbon atom of a corresponding unsubstituted compound or functional group is replaced by a substituent (e.g., $R^S$). The term "—H" means a hydrogen or hydrogen radical that is covalently bonded to another atom. As used in the present disclosure, the terms "hydrogen" and "—H" are interchangeable, and have identical meanings unless clearly specified.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. As a result, when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted. As used in the present disclosure, a $(C_1-C_{50})$ hydrocarbyl may be an unsubstituted or substituted $(C_1-C_{50})$ alkyl, $(C_3-C_{50})$cycloalkyl, $(C_3-C_{25})$cycloalkyl-$(C_1-C_{25})$alkylene, $(C_6-C_{50})$aryl, or $(C_6-C_{25})$aryl-$(C_1-C_{25})$alkylene (such as benzyl (—$CH_2$—$C_6H_5$)).

The term "$(C_1-C_{50})$alkyl" means a saturated straight or branched hydrocarbon radical containing from 1 to 50 carbon atoms. Each $(C_1-C_{50})$alkyl may be unsubstituted or substituted by one or more $R^S$. In embodiments, each hydrogen atom in a hydrocarbon radical may be substituted with $R^S$, such as, for example, trifluoromethyl. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{50})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is, for example, a $(C_{27}-C_{40})$alkyl substituted by one $R^S$, which is a $(C_1-C_5)$alkyl, such as, for example, methyl, trifluoromethyl, ethyl, 1-propyl, 1-methylethyl, or 1,1-dimethylethyl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{50})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{50})$cycloalkyl are substituted $(C_3-C_{20})$cycloalkyl, substituted $(C_3-C_{10})$cycloalkyl, and 1-fluorocyclohexyl.

The term "$(C_6-C_5)$aryl" means an unsubstituted or substituted (by one or more $R^S$) mono-, bi- or tricyclic aromatic hydrocarbon radical of from 6 to 50 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{50})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricycle heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, 3, or 4; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The term "polymer" refers to polymeric compounds prepared by polymerizing monomers, whether of the same or a different type. The generic term polymer thus includes homopolymers, which are polymers prepared by polymerizing only one monomer, and copolymers, which are polymers prepared by polymerizing two or more different monomers.

The term "interpolymer" refers to polymers prepared by polymerizing at least two different types of monomers. The generic term interpolymer thus includes copolymers and other polymers prepared by polymerizing more than two different monomers, such as terpolymers.

The terms "polyolefin," "polyolefin polymer," and "polyolefin resin" refer to polymers prepared by polymerizing a simple olefin (also referred to as an alkene, which has the general formula $C_nH_{2n}$) monomer. The generic term polyolefin thus includes polymers prepared by polymerizing ethylene monomer with or without one or more comonomers, such as polyethylene, and polymers prepared by polymerizing propylene monomer with or without one or more comonomers, such as polypropylene.

The terms "ethylene-based copolymer", "polyethylene" and "ethylene-based polymer" refer to polyolefins comprising greater than 50 percent (%) by mole of units that have been derived from ethylene monomer, which includes polyethylene homopolymers and copolymers. Common forms of polyethylene known in the art include Low Density Polyethylene (LDPE), Linear Low Density Polyethylene (LLDPE), Ultra Low Density Polyethylene (ULDPE), Very Low Density Polyethylene (VLDPE), Medium Density Polyethylene (MDPE), and High Density Polyethylene (HDPE).

The term "molecular weight distribution" means a ratio of two different molecular weights of a polymer. The generic term molecular weight distribution includes a ratio of a weight average molecular weight ($M_w$) of a polymer to a number average molecular weight ($M_n$) of the polymer, which may also be referred to as a "molecular weight distribution ($M_w/M_n$)," and a ratio of a z-average molecular weight ($M_z$) of a polymer to a weight average molecular weight ($M_w$) of the polymer, which may also be referred to as a "molecular weight distribution ($M_z/M_w$)."

The term "composition" means a mixture of materials that comprises the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

In embodiments, the catalyst system includes a procatalyst. The procatalyst includes a metal-ligand complex. The metal-ligand complex may have a structure according to formula (I):

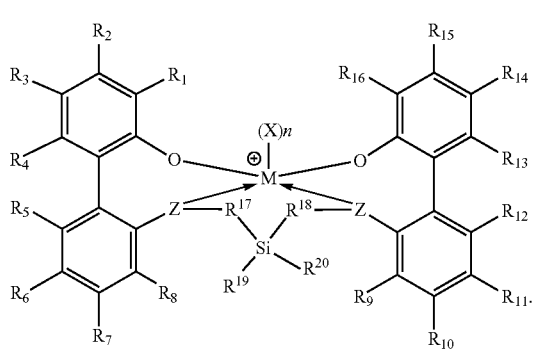

(I)

In one or more embodiments, the catalyst system includes the activated metal-ligand complex has a structure according to formula (Ia):

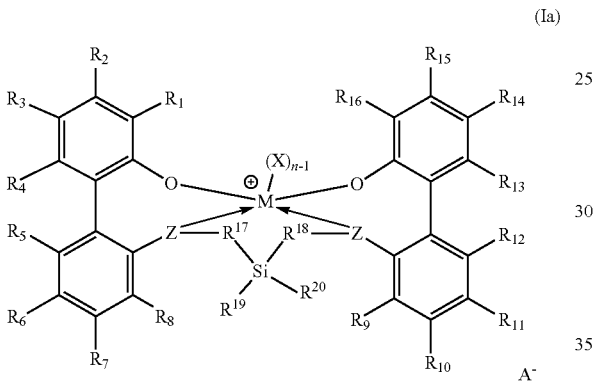

(Ia)

Formula (Ia) is a illustrative depiction of an active catalyst. When the metal-ligand complex of formula (I) is rendered catalytically active by an activator, the metal of the metal-ligand complex may have a formal charge of positive one (+1). In embodiments in which the procatalyst includes the metal-ligand complex, the metal-ligand complex has a structure according to formula (I) and is overall charge neutral. In embodiments in which the catalyst system includes the metal-ligand complex, the metal-ligand complex may have a structure according to formula (Ia) and has an overall formal charge of positive one (+1).

In formulas (I) and (Ia), M is titanium (Ti), zirconium (Zr), or hafnium (Hf). In embodiments, M is titanium, zirconium, or hafnium, each independently being in a formal oxidation state of +2, +3, or +4.

In formulas (I) and (Ia), subscript n of $(X)_n$ is 1, 2, or 3, and each X is a monodentate ligand independently chosen from unsaturated $(C_2-C_{50})$hydrocarbon, unsaturated $(C_2-C_{50})$heterohydrocarbon, $(C_1-C_{50})$hydrocarbyl, $(C_1-C_{50})$heterohydrocarbyl, $(C_6-C_{50})$aryl, $(C_4-C_{50})$heteroaryl, halogen, —$N(R^N)_2$, and —$N(R^N)COR^C$. In embodiments, each X is independently chosen from methyl; ethyl; 1-propyl; 2-propyl; 1-butyl; 2,2-dimethylpropyl; trimethylsilylmethyl; phenyl; benzyl; or chloro. In some embodiments, subscript n of $(X)_n$ is 2 and each X is the same. In other embodiments, at least two X are different. For example, subscript n of $(X)_n$ may be 2 and each X may be a different one of methyl; ethyl; 1-propyl; 2-propyl; 1-butyl; 2,2-dimethylpropyl; trimethylsilylmethyl; phenyl; benzyl; and chloro. In embodiments, subscript n of $(X)_n$ is 1 or 2 and at least two X independently are monoanionic monodentate ligands and a third X, if present, is a neutral monodentate ligand. In or more embodiments, subscript n of $(X)_n$ is 2.

In formulas (I), the metal-ligand complex is overall charge-neutral. In formula (Ia), the metal-ligand complex has an overall formal charge of positive one (+1).

In formulas (I) and (Ia), each Z is independently chosen from —O—, —S—, $(C_6-C_{50})$aryl, $(C_4-C_{50})$heteroaryl, $N(C_1-C_{50})$hydrocarbyl, and $P(C_1-C_{50})$hydrocarbyl. In embodiments, each Z is the same. For example, each Z may be —O—.

In formulas (I) and (Ia), $R^1$ and $R^{16}$ are independently chosen from $(C_6-C_{50})$aryl, $(C_4-C_{50})$heteroaryl, $(C_1-C_{50})$alkyl, $(C_3-C_{40})$heteroalkyl, radicals having formula (II), radicals having formula (III), and radicals having formula (IV):

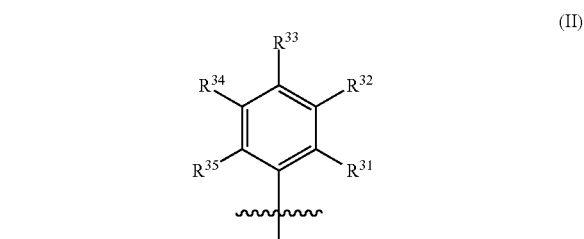

(II)

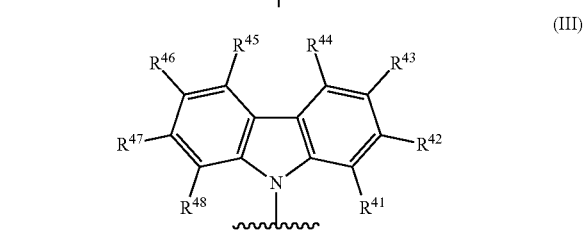

(III)

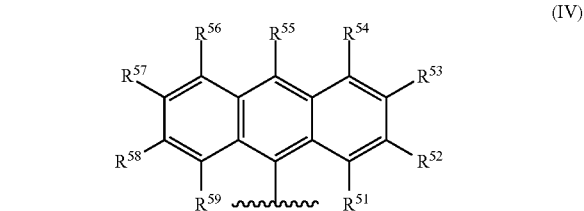

(IV)

In formula (II), $R^{31}$, $R^{32}$, $R^{33}$, $R^{34}$, $R^{35}$ are independently chosen from —H, $(C_1-C_{50})$hydrocarbyl, $(C_1-C_{50})$heterohydrocarbyl, —Si$(R^C)_3$, —Ge$(R^C)_3$, —P$(R^P)_2$, —N$(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, or halogen.

In formula (III), $R^{41}$, $R^{42}$, $R^{43}$, $R^{44}$, $R^{45}$, $R^{46}$, $R^{47}$, $R^{48}$ are independently chosen from —H, $(C_1-C_{50})$hydrocarbyl, $(C_1-C_{50})$heterohydrocarbyl, —Si$(R^C)_3$, —Ge$(R^C)_3$, —P$(R^P)_2$, —N$(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, or halogen.

In formula (IV), $R^{51}$, $R^{52}$, $R^{53}$, $R^{54}$, $R^{55}$, $R^{56}$, $R^{57}$, $R^{58}$, and $R^{59}$ are independently chosen from —H, $(C_1-C_{50})$hydrocarbyl, $(C_1-C_{50})$heterohydrocarbyl, —Si$(R^C)_3$, —Ge$(R^C)_3$, —P$(R^P)_2$, —N$(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, or halogen.

The groups $R^1$ and $R^{16}$ in the metal-ligand complex of formulas (I) and (Ia) are chosen independently of one another. For example, $R^1$ may be chosen from a radical having formula (II), (III), or (IV), and $R^{16}$ may be a $(C_4-C_{50})$heteroaryl; or $R^1$ may be chosen from a radical having formula (II), (III), or (IV), and $R^{16}$ may be chosen from a radical having formula (II), (III), or (IV), the same as or different from that of $R^1$. In embodiments, both $R^1$ and $R^{16}$ are radicals having formula (II), for which the groups $R^{31-35}$ are the same or different in $R^1$ and $R^{16}$. In some embodiments, both $R^1$ and $R^{16}$ are radicals having formula (III), for which the groups $R^{41-48}$ are the same or different in $R^1$ and $R^{16}$. In other embodiments, both $R^1$ and $R^{16}$ are radicals having formula (IV), for which the groups $R^{51-59}$ are the same or different in $R^1$ and $R^{16}$.

In embodiments, at least one of $R^1$ and $R^{16}$ is a radical having formula (II), where at least one of $R^{32}$ and $R^{34}$ are tert-butyl. In some embodiments, when at least one of $R^1$ or $R^{16}$ is a radical having formula (III), one of or both of $R^{43}$ and $R^{46}$ is tert-butyl and $R^{41-42}$, $R^{44-45}$, and $R^{47-48}$ are —H. In other embodiments, one of or both of $R^{42}$ and $R^{47}$ is tert-butyl and $R^{41}$, $R^{43-46}$, and $R^{48}$ are —H. In some embodiments, both $R^{42}$ and $R^{47}$ are —H. In some embodiments, $R^{41-48}$ are —H.

In formula (I), $R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1-C_{50})$hydrocarbyl, $(C_1-C_{50})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, and halogen.

In some embodiments, at least one of $R^5$, $R^6$, $R^7$, and $R^8$ is a halogen atom; and at least one of $R^9$, $R^{10}$, $R^{11}$, and $R^{12}$ is a halogen atom. In some embodiments, at least two of $R^5$, $R^6$, $R^7$, and $R^8$ are halogen atoms; and at least two of $R^9$, $R^{10}$, $R^{11}$, and $R^{12}$ are halogen atoms. In various embodiments, at least three of $R^5$, $R^6$, $R^7$, and $R^8$ are halogen atoms; and at least three of $R^9$, $R^{10}$, $R^{11}$, and $R^{12}$ are halogen atoms.

In embodiments, $R^3$ and $R^{14}$ are $(C_1-C_{24})$alkyl. In various embodiments, $R^3$ and $R^{14}$ are $(C_1-C_{20})$alkyl. In some embodiments, $R^3$ and $R^{14}$ are $(C_4-C_{24})$alkyl. In one or more embodiments, $R^3$ and $R^{14}$ are $(C_8-C_{12})$alkyl. In some embodiments, $R^3$ and $R^{14}$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, $R^3$ and $R^{14}$ are —OR$^C$, wherein R$^C$ is $(C_1-C_{20})$ hydrocarbon, and in some embodiments, R$^C$ is methyl, ethyl, 1-propyl, 2-propyl (also called iso-propyl), or 1,1-dimethylethyl.

In embodiments, $R^3$ and $R^{14}$ are methyl. In other embodiments, $R^3$ and $R^{14}$ are $(C_4-C_{24})$alkyl. In some embodiments, $R^8$ and $R^9$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl.

In some embodiments, $R^6$ and $R^{11}$ are halogen. In other embodiments, $R^6$ and $R^{11}$ are $(C_1-C_{24})$alkyl. In some embodiments, $R^6$ and $R^{11}$ independently are chosen from methyl, ethyl, 1-propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl. In some embodiments, $R^6$ and $R^{11}$ are tert-butyl. In embodiments, $R^6$ and $R^{11}$ are —OR$^C$, wherein R$^C$ is $(C_1-C_{20})$hydrocarbyl, and in some embodiments, R$^C$ is methyl, ethyl, 1-propyl, 2-propyl (also called iso-propyl), or 1,1-dimethylethyl. In other embodiments, $R^6$ and $R^{11}$ are —SiR$^C_3$, wherein each R$^C$ is independently $(C_1-C_{20})$hydrocarbyl, and in some embodiments, R$^C$ is methyl, ethyl, 1-propyl, 2-propyl (also called iso-propyl), or 1,1-dimethylethyl.

In some embodiments, $R^3$ and $R^{14}$ are methyl and $R^6$ and $R^{11}$ are halogen. In other embodiments, $R^6$ and $R^{11}$ are tert-butyl. In other embodiments, $R^3$ and $R^{14}$ are tert-octyl or n-octyl.

In formula (I), $R^{17}$ and $R^{18}$ are independently chosen from —$(CR^C_2)_m$—, wherein subscript m is from 1 to 10. In one or more embodiments, each subscript m is 1 or 2.

In formula (I), $R^{19}$ and $R^{20}$ are independently chosen from linear or branched $(C_1-C_{20})$alkyl. In some embodiments, $R^{19}$ and $R^{20}$ are independently chosen from linear or branched $(C_2-C_{20})$alkyl or $(C_3-C_7)$alkyl.

In formulas (I), (II), (III), and (IV), each R$^C$, R$^P$, and R$^N$ are independently chosen from —H, $(C_1-C_{50})$hydrocarbyl, and $(C_1-C_{50})$heterohydrocarbyl.

In embodiments, the procatalyst having the structure of metal-ligand complex of formula (I) may be rendered catalytically active by contacting it to, or combining it with, an activator. A procatalyst that has been rendered catalytically active by contacting it to, or combining it with, an activator may be referred to as a "catalyst system." That is, as used in the present disclosure, a catalyst system may include a procatalyst and one or more activators. The term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively, or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

In embodiments, the metal-ligand complex, the activator, or both, may be disposed on one or more support materials. For example, the metal-ligand complex may be deposited on, contacted with, vaporized with, bonded to, or incorporated within, adsorbed or absorbed in, or on, one or more support materials. The metal-ligand complex the activator, or both, may be combined with one or more support materials using one of the support methods well known in the art or as described below. As used in the present disclosure, the metal-ligand complex the activator, or both, may be in a supported form, for example, when deposited on, contacted with, or incorporated within, adsorbed or absorbed in, or on, one or more support materials.

Suitable support materials, such as inorganic oxides, include oxides of metals of Group 2, 3, 4, 5, 13 or 14 of the IUPAC periodic table. In embodiments, support materials include silica, which may or may not be dehydrated, fumed silica, alumina (e.g., as described in International Patent Application No. 1999/060033), silica-alumina, and mixtures of these. The fumed silica may be hydrophilic (untreated), alternatively hydrophobic (treated). In embodiments, the support material is hydrophobic fumed silica, which may be prepared by treating an untreated fumed silica with a treating agent, such as dimethyldichlorosilane, a polydimethylsiloxane fluid, or hexamethyldisilazane. In some embodiments, support materials include magnesia, titania, zirconia, magnesium chloride (e.g., as described in U.S. Pat. No. 5,965,477), montmorillonite (e.g., as described in European Patent No. 0 511 665), phyllosilicate, zeolites, talc, clays (e.g., as described in U.S. Pat. No. 6,034,187), and mixtures of these. In other embodiments, combinations of these support materials may be used, such as, for example, silica-chromium, silica-alumina, silica-titania, and combinations of these. Additional support materials may also include those porous acrylic polymers described in European Patent No. 0 767 184. Other support materials may also include nanocomposites described in International Patent Application No. 1999/047598; aerogels described in International Patent Application No. 1999/048605; spherulites described in U.S. Pat. No. 5,972,510; and polymeric beads described in International Patent Application No. 1999/050311.

In embodiments, the support material has a surface area of from 10 square meters per gram ($m^2/g$) to 700 $m^2/g$, a pore volume of from 0.1 cubic meters per gram ($cm^3/g$) to 4.0 $cm^3/g$, and an average particle size of from 5 microns ($\mu m$) to 500 $\mu m$. In some embodiments, the support material has a surface area of from 50 $m^2/g$ to 500 $m^2/g$, a pore volume of from 0.5 $cm^3/g$ to 3.5 $cm^3/g$, and an average particle size of from 10 $\mu m$ to 200 $\mu m$. In other embodiments, the support material may have a surface area of from 100 $m^2/g$ to 400 $m^2/g$, a pore volume from 0.8 $cm^3/g$ to 3.0 $cm^3/g$, and an average particle size of from 5 $\mu m$ to 100 $\mu m$. The average pore size of the support material is typically from 10 Angstroms (Å) to 1,000 Å, such as from 50 Å to 500 Å or from 75 Å to 350 Å.

There are various suitable methods to produce the catalyst systems of the present disclosure. In one or more embodiments, methods for producing the catalyst system include contacting one or more support materials, one or more activators, and a metal-ligand complex in an inert hydrocarbon solvent to produce the catalyst system. In some embodiments, the method for producing the catalyst system may include disposing the one or more activators on the one or more support materials to produce a supported activator, and contacting the supported activator with a solution of the metal-ligand complex in an inert hydrocarbon solvent (often referred to as a "trim catalyst" or a "trim feed"). For example, in some embodiments, methods for producing the catalyst system include contacting a spray-dried supported activator (i.e., a supported activator produced via spray drying) with a solution of the metal-ligand complex in an inert hydrocarbon solvent. In some embodiments, the supported activator may be included in a slurry, such as, for example a mineral oil slurry.

In some embodiments, the method for producing the catalyst system may include mixing one or more support materials, one or more activators, and a metal-ligand complex to produce a catalyst system precursor. The methods may further include drying the catalyst system precursor to produce the catalyst system. More specifically, the methods may include making a mixture of the metal-ligand complex, one or more support materials, one or more activators, or a combinations of these, and an inert hydrocarbon solvent. The inert hydrocarbon solvent may then be removed from the mixture so as to produce the metal-ligand complex, the one or more activators, or combinations of these, disposed on the one or more support materials. In embodiments, the removing step may be achieved via conventional evaporating of the inert hydrocarbon solvent from the mixture (i.e., conventional concentrating method), which yields an evaporated/supported catalyst system. In other embodiments, the removing step may be achieved by spray-drying the mixture, which produces spray-dried particles. It should be understood that the drying and/or removing steps may not result in the complete removal of liquids from the resulting catalyst system. That is, the catalyst system may include residual amounts (i.e., from 1 wt. % to 3 wt. %) of the inert hydrocarbon solvent.

As noted above, the catalyst systems of the present disclosure may be utilized in processes for producing polymers, such as polyethylene, via the polymerization of olefins, such as ethylene. In embodiments, one or more olefins may be contacted with the catalyst systems of the present disclosure in a gas-phase polymerization reactor, such as a gas-phase fluidized bed polymerization reactor. Exemplary gas-phase systems are described in U.S. Pat. Nos. 5,665,818; 5,677,375; and 6,472,484; and European Patent Nos. 0 517 868 and 0 794 200. For example, in some embodiments, ethylene and, optionally, one or more ($C_3$-$C_{12}$)α-olefin comonomers may be contacted with the catalyst systems of the present disclosure in a gas-phase polymerization reactor. The catalyst system may be fed to the gas-phase polymerization reactor in neat form (i.e., as a dry solid), as a solution, or as a slurry. For example, in some embodiments, spray-dried particles of the catalyst system may be fed directly to the gas-phase polymerization reactor. In other embodiments, a solution or slurry of the catalyst system in a solvent, such as an inert hydrocarbon or mineral oil, may be fed to the reactor. For example, the procatalyst may be fed to the reactor in an inert hydrocarbon solution and the activator may be fed to the reactor in a mineral oil slurry.

In embodiments, the gas-phase polymerization reactor comprises a fluidized bed reactor. A fluidized bed reactor may include a "reaction zone" and a "velocity reduction zone." The reaction zone may include a bed of growing polymer particles, formed polymer particles, and a minor amount of the catalyst system fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; European Patent No. 0 802 202; and Belgian Patent No. 839,380.

In embodiments, the reactor temperature of the gas-phase polymerization reactor is less than or equal to 150° C. For example, the reactor temperature of the gas-phase polymerization reactor may be from 30° C. to 120° C., from 30° C. to 110° C., from 30° C. to 100° C., from 30° C. to 90° C., from 30° C. to 50° C., from 30° C. to 40° C., from 40° C. to 150° C., from 40° C. to 120° C., from 40° C. to 110° C., from 40° C. to 100° C., from 40° C. to 90° C., from 40° C. to 50° C., from 50° C. to 150° C., from 50° C. to 120° C., from 50° C. to 110° C., from 50° C. to 100° C., from 50° C. to 90° C., from 90° C. to 150° C., from 90° C. to 120° C., from 90° C. to 110° C., from 90° C. to 100° C., from 100° C. to 150° C., from 100° C. to 120° C., from 100° C. to 110° C., from 110° C. to 150° C., from 110° C. to 120° C., or from 120° C. to 150° C. Generally, the gas-phase polymerization reactor may be operated at the highest temperature feasible, taking into account the sintering temperature of the polymer product within the reactor. Regardless of the process used to make the polyethylene, the reactor temperature should be below the melting or "sintering" temperature of the polymer product. As a result, the upper temperature limit may be the melting temperature of the polymer product.

In embodiments, the reactor pressure of the gas-phase polymerization reactor is from 690 kPa (100 psig) to 3,448 kPa (500 psig). For example, the reactor pressure of the gas-phase polymerization reactor may be from 690 kPa (100 psig) to 2,759 kPa (400 psig), from 690 kPa (100 psig) to 2,414 kPa (350 psig), from 690 kPa (100 psig) to 1,724 kPa (250 psig), from 690 kPa (100 psig) to 1,379 kPa (200 psig), from 1,379 kPa (200 psig) to 3,448 kPa (500 psig), from 1,379 kPa (200 psig) to 2,759 kPa (400 psig), from 1,379 kPa (200 psig) to 2,414 kPa (350 psig), from 1,379 kPa (200 psig) to 1,724 kPa (250 psig), from 1,724 kPa (250 psig) to 3,448 kPa (500 psig), from 1,724 kPa (250 psig) to 2,759 kPa (400 psig), from 1,724 kPa (250 psig) to 2,414 kPa (350 psig), from 2,414 kPa (350 psig) to 3,448 kPa (500 psig), from 2,414 kPa (350 psig) to 2,759 kPa (400 psig), or from 2,759 kPa (400 psig) to 3,448 kPa (500 psig).

In embodiments, hydrogen gas may be used in during polymerization to control the final properties of the polyethylene. The amount of hydrogen in the polymerization may be expressed as a mole ratio relative to the total polymerizable monomer, such as, for example, ethylene or a blend of ethylene and 1-hexene. The amount of hydrogen used in the polymerization process may be an amount necessary to achieve the desired properties of the polyethylene, such as, for example, melt flow rate (MFR). In embodiments, the mole ratio of hydrogen to total polymerizable monomer ($H_2$:monomer) is greater than 0.0001. For example, the mole ratio of hydrogen to total polymerizable monomer ($H_2$:monomer) may be from 0.0001 to 10, from 0.0001 to 5, from 0.0001 to 3, from 0.0001 to 0.10, from 0.0001 to 0.001, from 0.0001 to 0.0005, from 0.0005 to 10, from 0.0005 to 5, from 0.0005 to 3, from 0.0005 to 0.10, from 0.0005 to 0.001, from 0.001 to 10, from 0.001 to 5, from 0.001 to 3, from 0.001 to 0.10, from 0.10 to 10, from 0.10 to 5, from 0.10 to 3, from 3 to 10, from 3 to 5, or from 5 to 10.

In one or more embodiments, the process produces greater than or equal to 2,500 grams of the polyethylene per grams of the catalyst system per hour ($g_{poly}/g_{cat}$·hour). In some embodiments, process produces greater than or equal to 3,000 $g_{poly}/g_{cat}$·hour; 4,000 $g_{poly}/g_{cat}$·hour, or 5,000 $g_{poly}/g_{cat}$·hour.

In embodiments, the catalyst systems of the present disclosure may be utilized to polymerize a single type of olefin, producing a homopolymer. However, additional α-olefins may be incorporated into the polymerization scheme in other embodiments. The additional α-olefin comonomers typically have no more than 20 carbon atoms. For example, the catalyst systems of the present disclosure may be utilized to polymerize ethylene and one or more ($C_3$-$C_{12}$)α-olefin comonomers. Exemplary α-olefin comonomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or, in the alternative, from the group consisting of 1-hexene and 1-octene.

In one or more embodiments, the process produces ethylene-based copolymer with a ratio of a weight average molecular weight of the ethylene-based copolymer to weight percent comonomer content of the ethylene-based copolymer is greater than or equal to 10,000, 20,000, or 30,000.

In some embodiments, the process produces ethylene-based copolymer further comprises a molecular weight of greater than 500,000 g/mol. In some embodiments, the molecular weight of the produced ethylene-based copolymer is greater than 600,000 g/mol, greater than 700,000, or greater than 750,000 g/mol.

In various embodiments, the molecular weight comonomer distribution is greater than 0 when the reactor temperature is 85° C. to 105° C. In one or more embodiments, the molecular weight comonomer distribution is greater than 0 when the molecular weight is greater than 200,000 g/mol.

In embodiments, the ethylene-based copolymer also includes a comonomer incorporation of less than 30 wt. % as determined by Rapid FT-IR (Fourier Transformer Infrared) spectroscopy of the dissolved polymer as part of the GPC measurement. In some embodiments, the comonomer incorporation of less than 20 wt. %.

Most ethylene-based copolymers have comonomer contents (i.e., weight fraction amounts of constituent units derived from the 1-alkene that are in the copolymer) that vary with molecular weight of the constituent macromolecules thereof. Basically, if a higher molecular weight fraction of macromolecules has lower wt % comonomer content, this is a normal comonomer distribution versus molecular weight. The normal comonomer distribution may also be referred to as a normal short-chain branching distribution (normal SCBD) or normal molecular weight comonomer distribution index (normal MWCDI). If MWCDI is less than 0, there is a normal MWCDI or normal SCBD. If MWCDI=0, there is a flat MWCDI or flat SCBD. The MWCDI value is determined from a plot of SCB per 1000 carbon atoms versus Log(weight-average molecular weight) (Log($M_w$). See US 2017/008444 A1.

When a higher molecular weight fraction has higher wt % comonomer content, then it would be said to have a reverse comonomer distribution versus molecular weight. This phenomenon is also referred to as a reverse short-chain branching distribution (reverse SCBD), reverse molecular weight comonomer distribution index (reverse MWCDI), or broad-orthogonal composition distribution (BOCD). If MWCDI is greater than 0, there is a reverse comonomer distribution or reverse SCBD.

These comonomer content distributions across molecular weights are shown by plotting a linear regression of the comonomer content in weight percent (wt %) on a y-axis versus Log(M) on an x-axis. The wt % comonomer content is determined by rapid Fourier Transform-Infrared (FT-IR) spectroscopy on dissolved copolymer in a gel permeation chromatography (GPC) measurement using an infrared detector. M is the specific x-axis molecular weight point, $(10^{[Log(M)]})$ of a Flory distribution of molecular weight, as measured by GPC. In such a plot, the normal comonomer distribution has a negative slope (i.e., a line fitted to data points going from lower Log(M) values to higher Log(M) values (from left to right on the x-axis) slopes downward).

In embodiments, the one or more $(C_3\text{-}C_{12})\alpha$-olefin comonomers may not be derived from propylene. That is, the one or more $(C_3\text{-}C_{12})\alpha$-olefin comonomers may be substantially free of propylene. The term "substantially free" of a compound means the material or mixture includes less than 1.0 wt. % of the compound. For example, the one or more $(C_3\text{-}C_{12})\alpha$-olefin comonomers, which may be substantially free of propylene, may include less than 1.0 wt. % propylene, such as less than 0.8 wt. % propylene, less than 0.6 wt. % propylene, less than 0.4 wt. % propylene, or less than 0.2 wt. % propylene.

In embodiments, the polyethylene produced, for example homopolymers and/or interpolymers (including copolymers) of ethylene and, optionally, one or more comonomers may include at least 50 mole percent (mol. %) monomer units derived from ethylene. For example, the polyethylene may include at least 60 mol. %, at least 70 mol. %, at least 80 mol. %, or at least 90 mol. % monomer units derived from ethylene. In embodiments, the polyethylene includes from 50 mol. % to 100 mol. % monomer units derived from ethylene. For example, the polyethylene may include from 50 mol. % to 90 mol. %, from 50 mol. % to 80 mol. %, from 50 mol. % to 70 mol. %, from 50 mol. % to 60 mol. %, from 60 mol. % to 100 mol. %, from 60 mol. % to 90 mol. %, from 60 mol. % to 80 mol. %, from 60 mol. % to 70 mol. %, from 70 mol. % to 100 mol. %, from 70 mol. % to 90 mol. %, from 70 mol. % to 80 mol. %, from 80 mol. % to 100 mol. %, from 80 mol. % to 90 mol. %, or from 90 mol. % to 100 mol. % monomer units derived from ethylene.

In embodiments, the polyethylene produced includes at least 90 mol. % monomer units derived from ethylene. For example, the polyethylene may include at least 93 mol. %, at least 96 mol. %, at least 97 mol. %, or at least 99 mol. % monomer units derived from ethylene. In embodiments, the polyethylene includes from 90 mol. % to 100 mol. % monomer units derived from ethylene. For example, the polyethylene may include from 90 mol. % to 99.5 mol. %, from 90 mol. % to 99 mol. %, from 90 mol. % to 97 mol. %, from 90 mol. % to 96 mol. %, from 90 mol. % to 93 mol. %, from 93 mol. % to 100 mol. %, from 93 mol. % to 99.5 mol. %, from 93 mol. % to 99 mol. %, from 93 mol. % to 97 mol. %, from 93 mol. % to 96 mol. %, from 96 mol. % to 100 mol. %, from 96 mol. % to 99.5 mol. %, from 96 mol. % to 99 mol. %, from 96 mol. % to 97 mol. %, from 97 mol. % to 100 mol. %, from 97 mol. % to 99.5 mol. %, from 97 mol. % to 99 mol. %, from 99 mol. % to 100 mol. %, from 99 mol. % to 99.5 mol. %, or from 99.5 mol. % to 100 mol. % monomer units derived from ethylene.

In embodiments, the polyethylene produced includes less than 50 mol. % monomer units derived from an additional $\alpha$-olefin. For example, the polyethylene may include less than 40 mol %, less than 30 mol. %, less than 20 mol. % or less than 10 mol. % monomer units derived from an additional $\alpha$-olefin. In embodiments, the polyethylene includes from 0 mol. % to 50 mol. % monomer units derived from an additional $\alpha$-olefin. For example, the polyethylene may include from 0 mol. % to 40 mol. %, from 0 mol. % to 30 mol. %, from 0 mol. % to 20 mol. %, from 0 mol. % to 10 mol. %, from 0 mol. % to 5 mol. %, from 0 mol. % to 1 mol. %, from 1 mol. % to 50 mol. %, from 1 mol. % to 40 mol. %, from 1 mol. % to 30 mol. %, from 1 mol. % to 20 mol. %, from 1 mol. % to 10 mol. %, from 1 mol. % to 5 mol. %, from 5 mol. % to 50 mol. %, from 5 mol. % to 40 mol. %, from 5 mol. % to 30 mol. %, from 5 mol. % to 20 mol. %, from 5 mol. % to 10 mol. %, from 10 mol. % to 50 mol. %, from 10 mol. % to 40 mol. %, from 10 mol. % to 30 mol. %, from 10 mol. % to 20 mol. %, from 20 mol. % to 50 mol. %, from 20 mol. % to 40 mol. %, from 20 mol. % to 30 mol. %, from 30 mol. % to 50 mol. %, from 30 mol. % to 40 mol. %, or from 40 mol. % to 50 mol. % monomer units derived from an additional $\alpha$-olefin.

In embodiments, the polyethylene produced further includes one or more additives. Such additives include, but are not limited to, antistatic agents, color enhancers, dyes, lubricants, pigments, primary antioxidants, secondary antioxidants, processing aids, ultraviolet (UV) stabilizers, and combinations of these. The polyethylene may include any amounts of additives. In embodiments, the produced polyethylene further includes fillers, which may include, but are not limited to, organic or inorganic fillers, such as, for example, calcium carbonate, talc, or $Mg(OH)_2$.

The produced polyethylene may be used in a wide variety of products and end-use applications. The produced polyethylene may also be blended and/or co-extruded with any other polymer. Non-limiting examples of other polymers include linear low density polyethylene, elastomers, plastomers, high pressure low density polyethylene, high density polyethylene, polypropylenes, and the like. The produced polyethylene and blends including the produced polyethylene may be used to produce blow-molded components or products, among various other end uses. The produced polyethylene and blends including the produced polyethylene may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, and membranes in food-contact and non-food contact applications. Fibers may include melt spinning, solution spinning and melt blown fiber operations for use in woven or non-woven form to make filters, diaper fabrics, medical garments, and geotextiles. Extruded articles may include medical tubing, wire and cable coatings, pipe, geomembranes, and pond liners. Molded articles may include single and multi-layered constructions in the form of bottles, tanks, large hollow articles, rigid food containers and toys.

Test Methods

Polymerization Activity

Unless indicated otherwise, all polymerization activities (also referred to as productivities) presently disclosed were determined as a ratio of polymer produced to the amount of catalyst added to the reactor and are reported in grams of polymer per grams of catalyst per hour (gPE/gcat/hr).

Comonomer Content

Unless indicated otherwise, all comonomer contents (i.e., the amount of comonomer incorporated into a polymer) presently disclosed were determined by rapid FT-IR spectroscopy on dissolved polymer in a Gel Permeation Chromatography (GPC) measurement and are reported in weight percent (wt. %). The comonomer content of a polymer can be determined with respect to polymer molecular weight by use of an infrared detector, such as an IR5 detector, in a GPC measurement, as described in Lee et al., *Toward absolute chemical composition distribution measurement of polyolefins by high-temperature liquid chromatography hyphenated with infrared absorbance and light scattering detectors*, 86 ANAL. CHEM. 8649 (2014).

Uptake Ratio

Unless indicated otherwise, all uptake ratios presently disclosed were determined as a ratio of an amount of monomer units derived from a comonomer (e.g., a ($C_3$-$C_{12}$) α-olefin comonomer) to an amount of monomer units derived from ethylene.

Molecular Weight

Unless indicated otherwise, all molecular weights disclosed herein, including weight average molecular weight ($M_w$), number average molecular weight ($M_n$), and z-average molecular weight ($M_z$), were measured using conventional GPC and are reported in grams per mole (g/mol).

The chromatographic system consisted of a High Temperature Gel Permeation Chromatography (Polymer Laboratories), equipped with a differential refractive index detector (DRI). Three Polymer Laboratories PLgel 10 μm Mixed-B columns were used. The nominal flow rate was 1.0 mL/min, and the nominal injection volume was 300 μL. The various transfer lines, columns, and differential refractometer (the DRI detector) were contained in an oven maintained at 160° C. The solvent for the experiment was prepared by dissolving 6 grams of butylated hydroxytoluene as an antioxidant in 4 liters of Aldrich reagent-grade 1,2,4-trichlorobenzene (TCB). The TCB mixture was then filtered through a 0.1 μm Teflon filter. The TCB was then degassed with an online degasser before entering the GPC instrument.

The polymer solutions were prepared by placing dry polymer in glass vials, adding the desired amount of TCB, then heating the mixture at 160° C. with continuous shaking for about 2 hours. All quantities were measured gravimetrically. The injection concentration was from 0.5 to 2.0 mg/ml, with lower concentrations being used for higher molecular weight samples. Prior to running each sample the DRI detector was purged. The flow rate in the apparatus was then increased to 1.0 ml/minute, and the DRI was allowed to stabilize for 8 hours before injecting the first sample. The molecular weight was determined by combining universal calibration relationship with the column calibration which is performed with a series of monodispersed polystyrene (PS) standards. The MW was calculated at each elution volume with following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $a_{PS}$=0.67 and $K_{PS}$=0.000175, while $a_X$ and $K_X$ were obtained from published literature. Specifically, a/K=0.695/0.000579 for PE and 0.705/0.0002288 for PP.

The concentration, c, at each point in the chromatogram was calculated from the baseline-subtracted DRI signal, IDRI, using the following equation:

$$c = \frac{KDRI \times IDRI}{dn/dc}$$

where KDRI is a constant determined by calibrating the DRI, and (dn/dc) is the refractive index increment for the system. Specifically, dn/dc=0.109 for polyethylene.

The mass recovery was calculated from the ratio of the integrated area of the concentration chromatography over elution volume and the injection mass which is equal to the pre-determined concentration multiplied by injection loop volume.

EXAMPLES

The Examples include synthetic procedures for intermediates of the ligands, ligands, and the isolated procatalysts, and the polymerization processes that include the procatalysts (also called metal-ligand complexes). One or more features of the present disclosure are illustrated in view of the examples as follows:

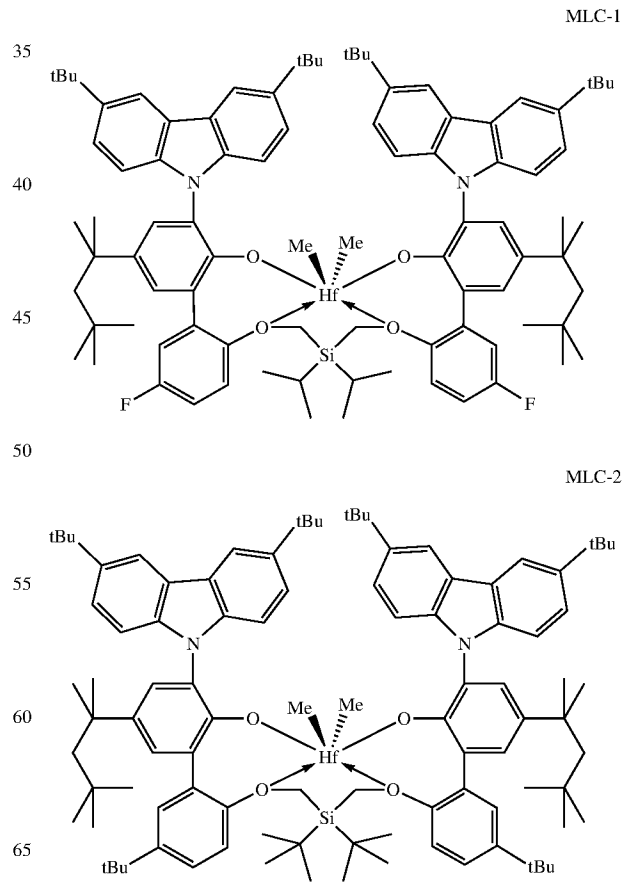

MLC-3
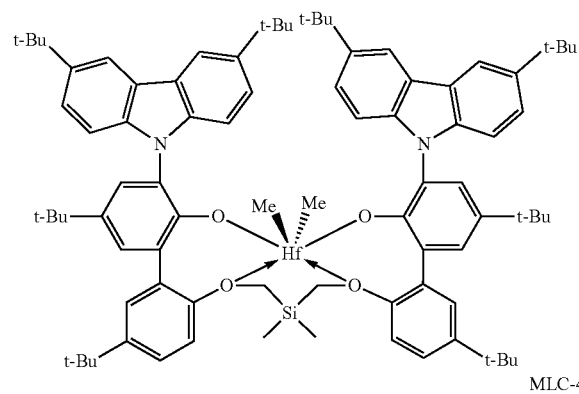
MLC-4
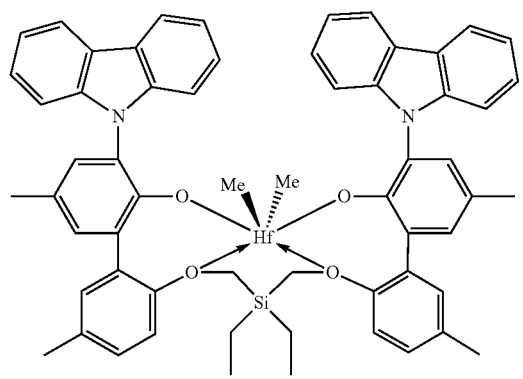
MLC-5
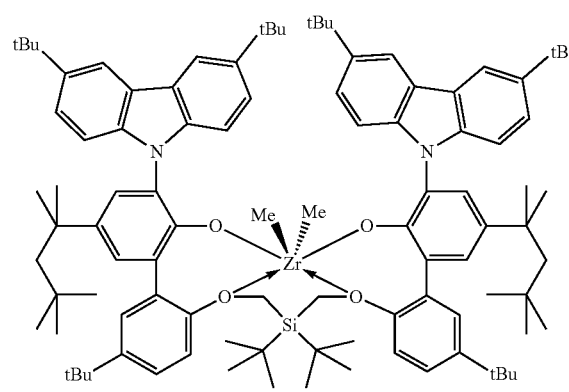
MLC-6
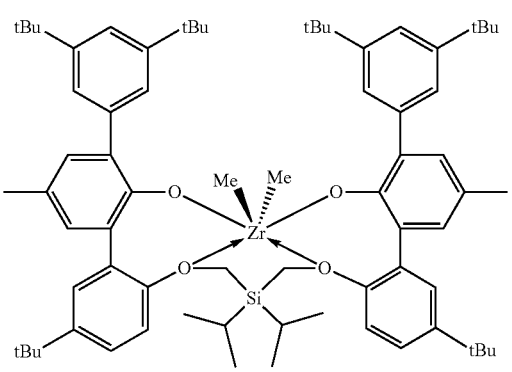
MLC-7
Synthesis of Metal-Ligand Complex 1 (MLC-1)
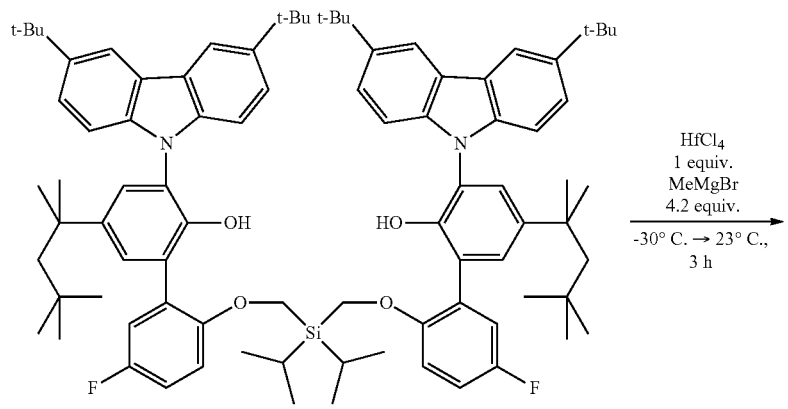

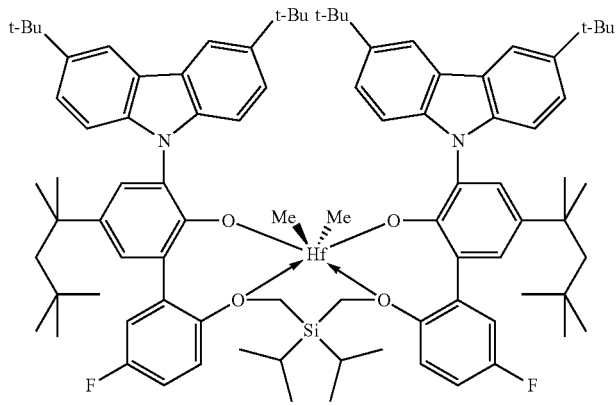

In a glovebox, MeMgBr (methylmagnesium bromide) in diethyl ether (3.00 M, 0.28 mL, 0.84 mmol, 4.2 eq) was added to a −30° C. suspension of HfCl$_4$ (64 mg, 0.2 mmol, 1.0 eq) in anhydrous toluene (6.0 mL). After stirring the resulting mixture for 10 minutes, solid ligand (described in International Publication No. WO 2018/022975 A1; 266 mg, 0.2 mmol, 1.0 eq) was added portionwise. The resulting mixture was stirred overnight before the solvent was removed under vacuum to afford a dark residue, which was extracted with hexanes (12 mL). The resulting extract was concentrated to approximately 2 mL and placed in a freezer for one day. Any remaining solvent was decanted and the remaining material was dried under vacuum, which provided a metal-ligand complex (204 mg, yield: 66%) as a white powder:

$^1$H NMR (400 MHz, C$_6$D$_6$) δ 8.64-8.60 (m, 2H), 8.42-8.38 (m, 8H), 7.67-7.47 (m, 8H), 7.45-7.39 (m, 2H), 7.26 (d, J=2.5 Hz, 2H), 7.07 (dd, J=8.9, 3.1 Hz, 3H), 6.84-6.75 (m, 2H), 5.27-5.19 (m, 2H), 4.35 (d, J=14.1 Hz, 2H), 3.29 (d, J=14.1 Hz, 2H), 1.57 (d, J=3.5 Hz, 4H), 1.47 (s, 18H), 1.34-1.19 (m, 30H), 0.80 (s, 18H), 0.58-0.48 (m, 12H), 0.35-0.24 (m, 2H), −1.08 (s, 6H).

$^{19}$F{1H} NMR (376 MHz, CDCl$_3$) δ −116.40 (m, 2F).

Synthesis of Metal-Ligand Complex 2 (MLC-2)

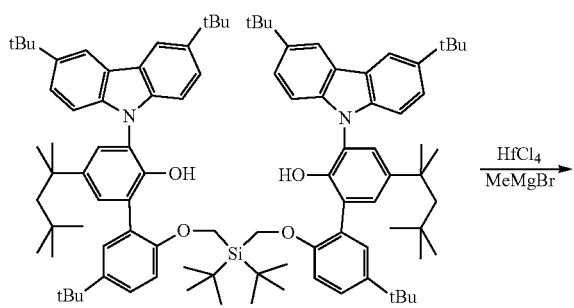

$\xrightarrow{\text{HfCl}_4}{\text{MeMgBr}}$

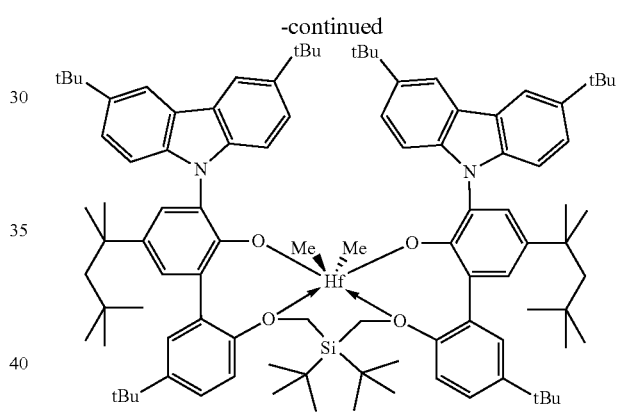

In a glovebox, MeMgBr (methylmagnesium bromide) in diethyl ether (3 M, 0.28 mL, 0.84 mmol, 4.2 eq) was added to a −30° C. suspension of HfCl$_4$ (64 mg, 0.2 mmol, 1.0 eq) in anhydrous toluene (6.0 mL). After stirring the resulting mixture for 10 minutes, solid ligand (described previously with regard to MLC-3; 287 mg, 0.2 mmol, 1.0 eq) was added portionwise. The resulting mixture was stirred overnight before the solvent was removed under vacuum to afford a dark residue, which was extracted with hexanes (15 mL). The resulting extract was concentrated to approximately 2-3 mL and placed in a freezer for one day. Any remaining solvent was decanted and the remaining material was dried under vacuum, which provided a metal-ligand complex (270 mg, yield: 82%) as a white powder:

$^1$H NMR (400 MHz, C$_6$D$_6$) δ 8.71 (d, J=1.9 Hz, 2H), 8.38 (d, J=1.9 Hz, 2H), 7.69-7.59 (m, 6H), 7.49 (dd, J=11.6, 2.5 Hz, 4H), 7.42-7.37 (m, 2H), 7.32 (dd, J=8.7, 1.8 Hz, 2H), 7.28-7.23 (m, 2H), 5.20 (d, J=8.7 Hz, 2H), 4.14 (d, J=13.6 Hz, 2H), 3.14 (d, J=13.6 Hz, 2H), 1.85-1.77 (m, 2H), 1.69-1.62 (m, 2H), 1.57 (s, 18H), 1.45-1.32 (m, 48H), 0.95 (s, 18H), 0.58 (s, 18H), −1.47 (s, 6H).

Synthesis of Metal-Ligand Complex 3 (MLC-3)

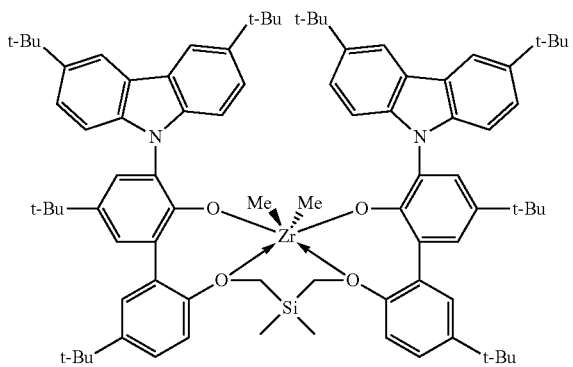

In a glovebox, MeMgBr in diethyl ether (3 M, 0.11 mL, 0.32 mmol) was added to a −35° C. suspension of HfCl$_4$ (0.026 g, 0.081 mmol) in anhydrous toluene (5 mL). After stirring the resulting mixture for 5 minutes, ligand (described in U.S. Pat. No. 9,029,487; 0.100 g, 0.081 mmol) in toluene (5 mL) was added portionwise. The resulting mixture was stirred overnight before the solvent was removed under vacuum to afford a dark residue, which was extracted with a mixture of hexane and toluene (1:1, 10 mL). The resulting extract was filtered and dried under vacuum, which provided a metal-ligand complex (0.089 g, yield: 76%) as a white powder:

$^1$H NMR (400 MHz, C$_6$D$_6$): δ 8.44-8.33 (m, 2H), 8.10-8.03 (m, 2H), 7.69 (d, J=2.6 Hz, 2H), 7.67-7.63 (m, 2H), 7.56 (d, J=2.6 Hz, 2H), 7.52-7.46 (m, 8H), 7.45-7.40 (m, 2H), 7.14-6.98 (m, 2H), 5.15 (d, J=8.7 Hz, 2H), 4.30 (d, J=14.2 Hz, 2H), 3.14 (d, J=14.3 Hz, 2H), 1.30 (s, 18H), 1.14 (s, 18H), −0.72 (s, 6H), −1.04 (s, 6H).

Synthesis of Metal-Ligand Complex 4 (MLC-4)

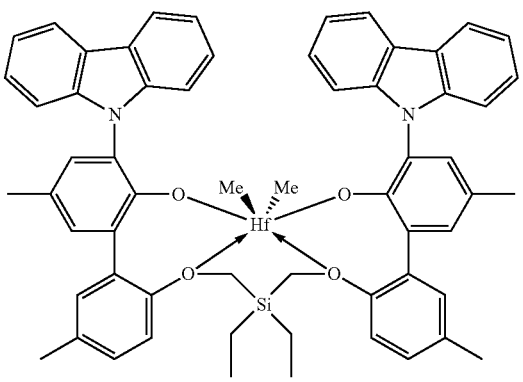

In a glovebox, MeMgBr in diethyl ether (3 M, 0.23 mL, 0.69 mmol) was added to a −35° C. suspension of HfCl$_4$ (0.055 g, 0.172 mmol) in anhydrous toluene (5 mL). After stirring the resulting mixture for 5 minutes, ligand (described in International Publication No. WO 2008/033197 A2; 0.150 g, 0.172 mmol) in toluene (5 mL) was added portion wise. The resulting mixture was stirred overnight before the solvent was removed under vacuum to afford a dark residue, which was extracted with a mixture of hexane and toluene (1:1, 10 mL). The resulting extract was filtered and dried under vacuum, which provided a metal-ligand complex (0.185 g, yield: 100%) as a white powder:

$^1$H NMR (400 MHz, Benzene-d$_6$): δ 8.37-8.29 (m, 2H), 8.09 (dt, J=7.6, 1.0 Hz, 2H), 7.61-7.55 (m, 2H), 7.53 (dd, J=8.3, 0.9 Hz, 2H), 7.44 (ddd, J=8.2, 7.1, 1.4 Hz, 2H), 7.38 (td, J=7.4, 1.1 Hz, 2H), 7.24 (ddd, J=8.3, 7.1, 1.3 Hz, 2H), 7.14-7.09 (m, 4H), 7.04-6.98 (m, 4H), 6.73 (dd, J=8.4, 2.3 Hz, 2H), 5.02 (d, J=8.3 Hz, 2H), 4.36 (d, J=14.2 Hz, 2H), 3.19 (d, J=14.2 Hz, 2H), 2.16 (s, 6H), 1.97 (s, 6H), 0.37 (t, J=8.0 Hz, 6H), −0.01--0.27 (m, 4H), −1.09 (s, 6H).

Synthesis of Metal-Ligand Complex 5 (MLC-5)

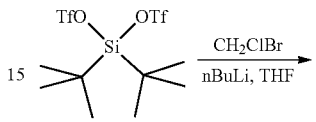

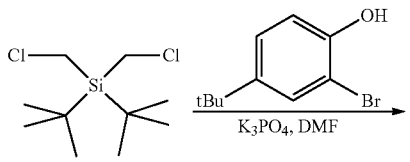

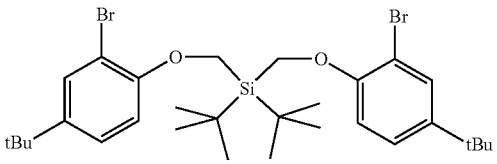

In a glovebox, di-t-butylsilyl ditriflate (4.41 g, 10.0 mmol, 1.0 eq) was dissolved in anhydrous THF (50 mL) in a 250 mL single-neck round-bottom flask. The flask was capped with a septum, sealed, taken out of glove box, and cooled to −78° C. in a dry ice-acetone bath before adding bromochloromethane (1.95 mL, 30 mmol, 3.0 eq). Next, a solution of n-BuLi (9.2 mL, 23.0 mmol, 2.3 eq) in hexane was added to the cooled wall of the flask over a period of 3 hours using a syringe pump. The resulting mixture was allowed to warm up to room temperature overnight (approximately 16 hours) before adding saturated NH$_4$Cl (30 mL). The resulting two layers were separated and the aqueous layer was extracted with ether (2×50 mL). The combined organic layer was dried over MgSO$_4$, filtered, and concentrated under reduced pressure. The crude product was used for the next step without further purification.

In a glovebox, a 40 mL vial was charged with bis (chloromethyl)di-t-butylsilane (1.21 g, 5.0 mmol, 1.0 eq), 4-t-butyl-2-bromophenol (4.6 g, 20.0 mmol, 4.0 eq), K$_3$PO$_4$ (6.39 g, 30.0 mmol, 6.0 eq), and DMF (5 mL), and the reaction mixture was stirred at 110° C. overnight. After cooling down to room temperature, the reaction mixture was purified by column chromatography using ether/hexane (0/100-30/70) as the eluent, which provided bis((2-bromo-4-t-butylphenoxy)methyl)di-t-butylsilane (2.6 g, yield: 83%) as a colorless oil:

$^1$H NMR (400 MHz, CDCl$_3$) δ 7.53 (d, J=2.4 Hz, 2H), 7.28 (dd, J=8.6, 2.4 Hz, 2H), 7.00 (d, J=8.7 Hz, 2H), 3.96 (s, 4H), 1.29 (s, 18H), 1.22 (s, 18H).

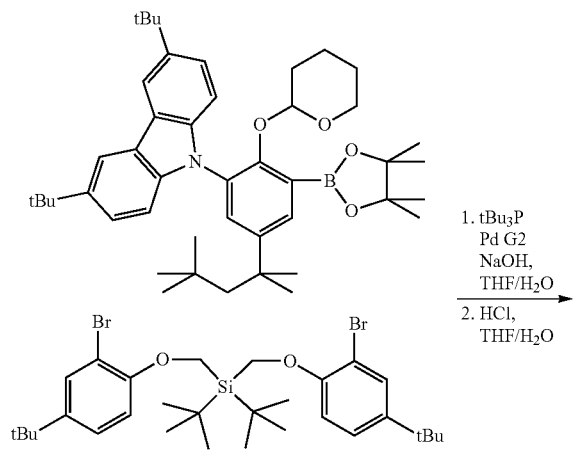

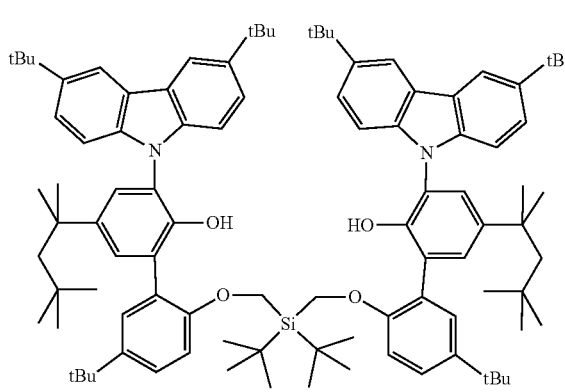

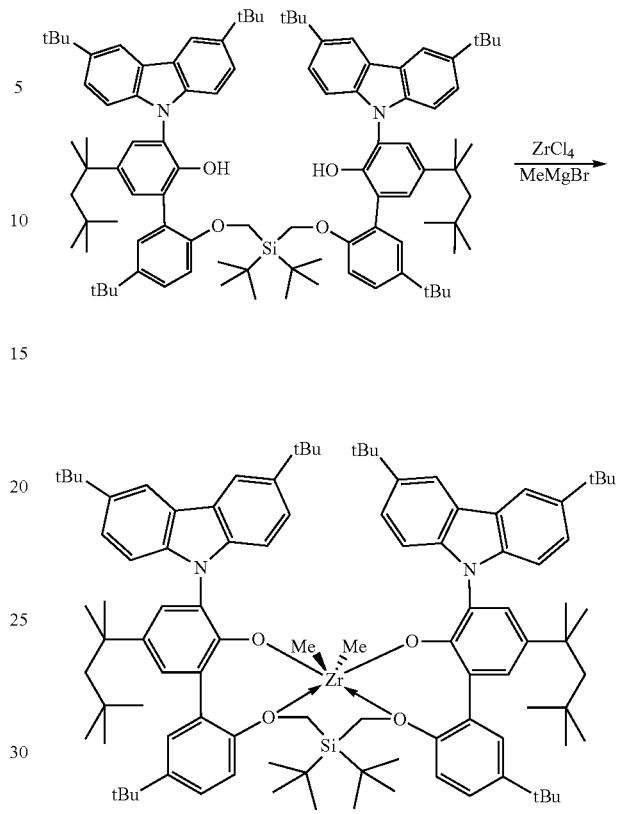

In a glovebox, a 40 mL vial equipped with a stir bar was charged with bis((2-bromo-4-t-butylphenoxy)methyl)di-t-butylsilane (0.46 g, 0.73 mmol, 1.0 eq), 3,6-di-tert-butyl-9-(2-(((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (1.53 g, 2.2 mmol, 3.0 eq), tBu₃P Pd G2 (0.011 g, 0.022 mmol, 0.03 eq), THF (2 mL), and NaOH (4M, 1.1 mL, 4.4 mmol, 6.0 eq). The vial was heated under nitrogen at 55° C. for 2 hours. When completed, the top organic layer was extracted with ether and filtered through a short plug of silica gel, and solvents were removed under reduced pressure. The resulting residue was dissolved in THF (10 mL) and MeOH (10 mL). Concentrated HCl (0.5 mL) was then added. The resulting mixture was heated at 75° C. for 2 hours before being cooled to room temperature. The solvents were then removed under reduced pressure and the resulting residue was purified by reverse phase column chromatography using THF/MeCN (0/100>100/0) as the eluent, which provided 6',6'''-(((di-t-butylsilanediyl)bis(methylene))bis(oxy))bis(3-(3,6-di-t-butyl-9H-carbazol-9-yl)-3'-fluoro-5-(2,4,4-trimethylpentan-2-yl)-[1,1'-biphenyl]-2-ol) (0.71 g, yield: 67%) as a white solid:

¹H NMR (400 MHz, CDCl₃) δ 8.44-8.07 (m, 6H), 7.59-7.45 (m, 2H), 7.23-7.11 (m, 4H), 6.99-6.69 (m, 6H), 6.53-6.38 (m, 2H), 5.26-5.16 (m, 4H), 3.81 (br s, 2H), 3.19 (br s, 2H), 1.60-1.05 (m, 70H), 0.85 (s, 18H), 0.74 (s, 18H).

In a glovebox, MeMgBr (methylmagnesium bromide) in diethyl ether (3 M, 0.28 mL, 0.84 mmol, 4.2 eq) was added to a −30° C. suspension of ZrCl₄ (47 mg, 0.2 mmol, 1.0 eq) in anhydrous toluene (6.0 mL). After stirring the resulting mixture for 2 minutes, solid 6',6'''-(((di-t-butylsilanediyl)bis(methylene))bis(oxy))bis(3-(3,6-di-t-butyl-9H-carbazol-9-yl)-3'-fluoro-5-(2,4,4-trimethylpentan-2-yl)-[1,1'-biphenyl]-2-ol) (287 mg, 0.2 mmol, 1.0 eq) was added portion wise. The resulting mixture was stirred overnight before the solvent was removed under vacuum to afford a dark residue, which was extracted with hexanes (15 mL). The resulting extract was concentrated to approximately 2-3 mL and placed in a freezer for one day. Any remaining solvent was decanted and the remaining material was dried under vacuum, which provided a metal-ligand complex (250 mg, yield: 80%) as a white powder:

¹H NMR (400 MHz, C₆D₆) δ 8.71 (d, J=1.7 Hz, 2H), 8.38 (d, J=1.7 Hz, 2H), 7.68-7.59 (m, 6H), 7.52-7.42 (m, 6H), 7.34 (s, 2H), 7.33 (dd, J=8.7, 1.9 Hz, 2H), 7.24 (dd, J=8.7, 2.6 Hz, 2H), 5.17 (d, J=8.7 Hz, 2H), 4.05 (d, J=13.5 Hz, 2H), 3.08 (d, J=13.5 Hz, 2H), 1.85-1.77 (m, 2H), 1.70-1.62 (m, 2H), 1.57 (s, 18H), 1.45-1.32 (m, 48H), 0.95 (s, 18H), 0.59 (s, 18H), −1.22 (s, 6H).

Synthesis of Metal-Ligand Complex 6 (MLC-6)

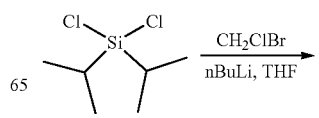

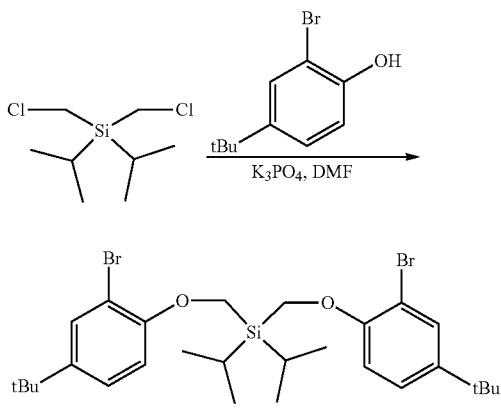

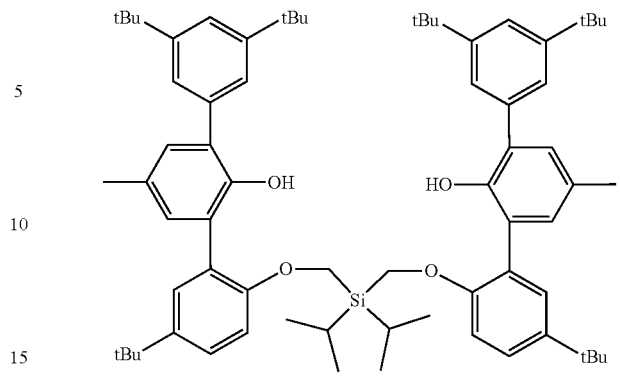

In a glovebox, diisopropyldichlorosilane (3.703 g, 20 mmol, 1.0 eq) was dissolved in anhydrous THF (120 mL) in a 250 mL single-neck round-bottom flask. The flask was capped with a septum, sealed, taken out of glovebox, and cooled to −78° C. in a dry ice-acetone bath before adding bromochloromethane (3.9 mL, 60 mmol, 3.0 eq). Next, a solution of n-BuLi (18.4 mL, 46 mmol, 2.3 eq) in hexane was added to the cooled wall of the flask over a period of 3 hours using a syringe pump. The mixture was allowed to warm up to room temperature overnight (approximately 16 hours) before adding saturated NH$_4$Cl (30 mL). The resulting two layers were separated and the aqueous layer was extracted with ether (2×50 mL). The combined organic layer was dried over MgSO$_4$, filtered, and concentrated under reduced pressure. The crude product was used for the next step without further purification.

In a glovebox, a 40 mL vial was charged with bis(chloromethyl)diisopropylsilane (2.14 g, 10 mmol, 1.0 eq), 4-t-butyl-2-bromophenol (6.21 g, 27 mmol, 2.7 eq), K$_3$PO$_4$ (7.46 g, 35 mmol, 3.5 eq), and DMF (10 mL), and the reaction mixture was stirred at 80° C. overnight. After cooling down to room temperature, the reaction mixture was purified by column chromatography using ether/hexane (0/100>30/70) as the eluent, which provided bis((2-bromo-4-t-butylphenoxy)methyl)diisopropylsilane (4.4 g, yield: 73%) as a colorless oil:

$^1$H NMR (400 MHz, CDCl$_3$) δ 7.51 (d, J=2.4 Hz, 2H), 7.26 (dd, J=8.6, 2.4 Hz, 2H), 6.98 (d, J=8.6 Hz, 2H), 3.93 (s, 4H), 1.45-1.33 (m, 2H), 1.28 (s, 18H), 1.20 (d, J=7.3 Hz, 12H).

In a glove box, a 40 mL vial equipped with a stir bar was charged with bis((2-bromo-4-t-butylphenoxy)methyl)diisopropylsilane (1.20 g, 2.0 mmol, 1.0 eq), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (2.54 g, 5.0 mmol, 2.5 eq), tBu$_3$P Pd G2 (0.031 g, 0.06 mmol, 0.03 eq), THF (3 mL), and NaOH (4 M, 3.0 mL, 12.0 mmol, 6.0 eq). The vial was heated under nitrogen at 55° C. for 2 hours. When completed, the top organic layer was extracted with ether and filtered through a short plug of silica gel and solvents were removed under reduced pressure. The resulting residue was dissolved in THF (10 mL) and MeOH (10 mL). Concentrated HCl (0.5 mL) was then added and the resulting mixture was heated at 75° C. for 2 hours before being cooled to room temperature. The solvents were then removed under reduced pressure and the resulting residue was purified by reverse phase column chromatography using THF/MeCN (0/100>100/0) as the eluent, which provided 6",6""-(((diisopropylsilanediyl)bis(methylene))bis(oxy))bis (3,3",5-tri-tert-butyl-5'-methyl-[1,1':3',1"-terphenyl]-2'-ol) (1.62 g, yield: 78%) as a white solid:

$^1$H NMR (400 MHz, CDCl$_3$) δ 7.39 (t, J=1.8 Hz, 2H), 7.36 (d, J=1.8 Hz, 4H), 7.29 (d, J=2.5 Hz, 2H), 7.22 (dd, J=8.6, 2.6 Hz, 2H), 7.10 (d, J=2.2 Hz, 2H), 6.94 (d, J=2.3, 2H), 6.75 (d, J=8.6 Hz, 2H), 5.37 (s, 2H), 3.61 (s, 4H), 2.32 (d, J=0.9 Hz, 6H), 1.33 (s, 36H), 1.29 (s, 18H), 0.90-0.81 (m, 2H), 0.73 (d, J=7.1 Hz, 12H).

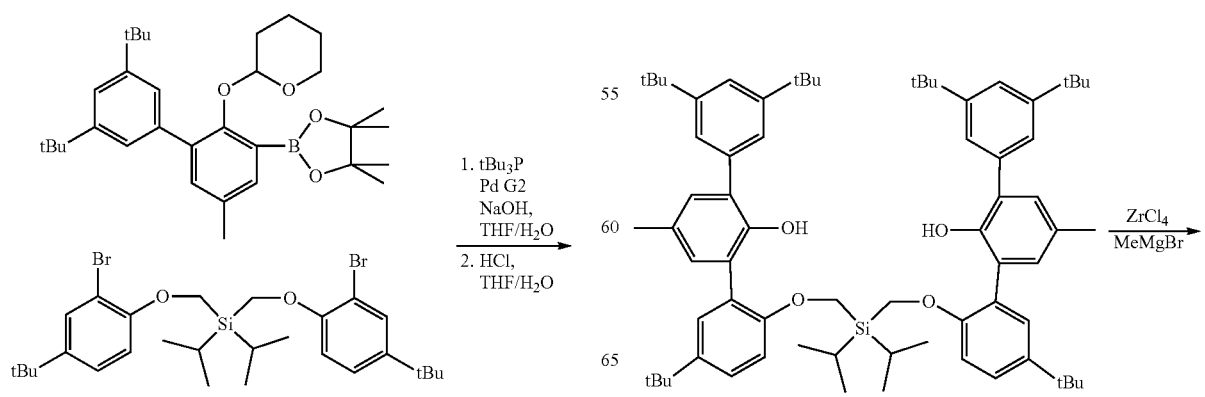

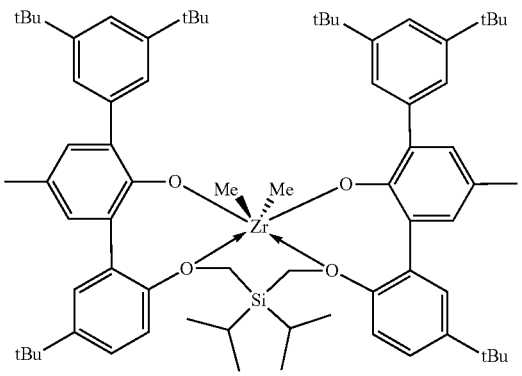

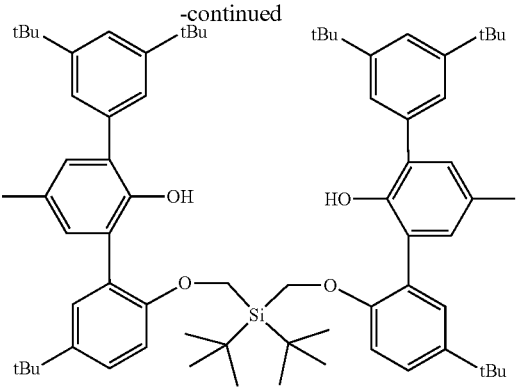

In a glovebox, MeMgBr in diethyl ether (3.00 M, 0.29 mL, 0.86 mmol, 4.3 eq) was added to a −30° C. suspension of ZrCl$_4$ (47 mg, 0.2 mmol, 1.0 eq) in anhydrous toluene (6.0 mL). After stirring for 2 minutes, 6",6""'-(((diisopropylsilanediyl)bis(methylene))bis(oxy))bis(3,3",5-tri-tert-butyl-5'-methyl-[1,1':3',1"-terphenyl]-2'-ol) (206 mg, 0.2 mmol, 1.0 eq) was added portion wise. The resulting mixture was stirred at room temperature overnight before the solvent was removed under vacuum to afford a dark residue, which was washed with hexanes (10 mL) then extracted with toluene (12 mL). After filtering, the toluene extract was dried under vacuum, which provided a metal-ligand complex (170 mg, yield: 74%) as a white solid:

$^1$H NMR (400 MHz, C$_6$D$_6$) δ 8.20-7.67 (m, 4H), 7.79 (t, J=1.8 Hz, 2H), 7.56 (d, J=2.5 Hz, 2H), 7.26 (d, J=2.4, 2H), 7.21 (d, J=2.4, 2H), 7.18 (d, J=2.4, 2H), 5.67 (d, J=8.6 Hz, 2H), 4.61 (d, J=13.5 Hz, 2H), 3.46 (d, J=13.5 Hz, 2H), 2.26 (s, 6H), 1.47 (s, 36H), 1.25 (s, 18H), 0.52 (dd, J=17.0, 7.5 Hz, 12H), 0.30-0.18 (m, 2H), −0.05 (s, 6H).

Synthesis of Metal-Ligand Complex 7 (MLC-7)

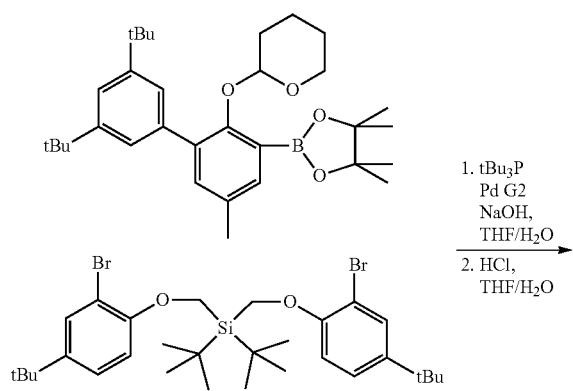

In a glovebox, a 40 mL vial equipped with a stir bar was charged with bis((2-bromo-4-t-butylphenoxy)methyl)di-t-butylsilane (0.5 g, 0.80 mmol, 1.0 eq), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (1.21 g, 2.40 mmol, 3.0 eq), tBu$_3$P Pd G2 (0.012 g, 0.024 mmol, 0.03 eq), THF (2 mL), and KOH (4M, 1.2 mL, 4.8 mmol, 6.0 eq). The vial was heated under nitrogen at 55° C. for 2 hours. When completed, the top organic layer was extracted with ether and filtered through a short plug of silica gel, and solvents were removed under reduced pressure. The resulting residue was dissolved in THF (10 mL) and MeOH (10 mL). Concentrated HCl (0.5 mL) was then added. The resulting mixture was heated at 75° C. for 2 hours before being cooled to room temperature. The solvents were then removed under reduced pressure and the resulting residue was purified by reverse phase column chromatography using THF/MeCN (0/100>100/0) as the eluent, which provided 6",6""'-(((di-t-butylsilanediyl)bis(methylene))bis(oxy))bis(3,3",5-tri-tert-butyl-5'-methyl-[1,1':3',1"-terphenyl]-2'-ol) (0.63 g, yield: 75%) as a white solid:

$^1$H NMR (400 MHz, CDCl$_3$) δ 7.39-7.37 (m, 2H), 7.36-7.34 (m, 2H), 7.25-7.22 (m, 2H), 7.10 (d, J=2.4 Hz, 2H), 6.93 (d, J=2.3, 2H), 6.83 (d, J=8.2, 2H), 5.13 (s, 2H), 3.63 (s, 4H), 2.32 (s, 6H), 1.32 (s, 36H), 1.28 (s, 18H), 0.78 (s, 18H).

In a glovebox, MeMgBr in diethyl ether (3 M, 0.281 mL, 0.86 mmol, 4.3 eq) was added to a −30° C. suspension of ZrCl$_4$ (0.046 g, 0.2 mmol, 1.0 eq) in anhydrous toluene (6 mL). After stirring the resulting mixture for 2 minutes, solid 6",6""'-(((di-t-butylsilanediyl)bis(methylene))bis(oxy))bis(3,3",5-tri-tert-butyl-5'-methyl-[1,1':3',1"-terphenyl]-2'-ol) (0.212 g, 0.2 mmol, 1.0 eq) was added portion wise. The resulting mixture was rinsed with toluene (2 mL) and stirred overnight before the solvent was removed under vacuum to afford a dark residue, which was washed with hexanes (10 mL) and filtered before being extracted with toluene (15 mL). The resulting extract was dried under vacuum, which provided a metal-ligand complex (0.2 g, yield: 85%) as a white powder:

$^1$H NMR (400 MHz, C$_6$D$_6$) δ 7.93 (br s, 2H), 7.79 (t, J=1.9 Hz, 2H), 7.65 (br s, 2H), 7.63 (d, J=2.5 Hz, 2H), 7.23-7.17 (m, 4H), 7.04-6.98 (m, 2H), 5.92 (d, J=8.6 Hz, 2H), 4.56 (d, J=13.3 Hz, 2H), 3.45 (d, J=13.2 Hz, 2H), 2.25 (s, 6H), 1.69-1.32 (m, 36H), 1.28 (s, 18H), 0.52 (s, 18H), −0.18 (s, 6H).

Preparation of Inventive Spray-Dried Effective Catalysts:
Production of Catalyst Systems Various catalyst systems were produced via spray drying. Specifically, fumed silica (commercially available as CAB- O-SIL® from Cabot Corporation) and methylaluminoxane (10 wt. % in toluene) were dissolved in toluene and mixed for 15 minutes. A metal-ligand complex was added to the resulting slurry and mixed for an additional 30 to 60 minutes. The resulting catalyst system precursor was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm.

TABLE 1

Preparation of the Catalyst Systems

| Catalyst System | Metal-Ligand Complex | Mass of Metal-Ligand Complex (g) | Mass of Fumed Silica (g) | Mass of MAO (g) | Mass of Toluene (g) |
|---|---|---|---|---|---|
| sd-Cat1 | MLC-1 | 0.103 | 0.795 | 6.6 | 22.5 |
| sd-Cat2 | MLC-2 | 0.087 | 0.700 | 6.2 | 20.0 |
| sd-Cat3 | MLC-3 | 0.070 | 0.640 | 5.7 | 18.0 |
| sd-Cat4 | MLC-4 | 0.055 | 0.700 | 6.0 | 19.0 |
| sd-Cat5 | MLC-5 | 0.082 | 0.700 | 6.2 | 20.0 |
| sd-Cat6 | MLC-6 | 0.063 | 0.750 | 6.4 | 21.0 |
| sd-Cat7 | MLC-7 | 0.069 | 0.800 | 6.8 | 22.0 |

Gas-Phase Batch Reactor Test:

The spray dried catalysts prepared above were used for ethylene/1-hexene copolymerizations conducted in the gas-phase in a 2 L semi-batch autoclave polymerization reactor. The individual run conditions and the properties of the polymers produced in these runs are tabulated Tested Property Results.

Gas-Phase Batch Reactor Catalyst Testing Procedure:

The gas phase reactor employed is a 2 liter, stainless steel autoclave equipped with a mechanical agitator. For the experimental runs, the reactor was first dried for 1 hour, charged with 200 g of NaCl and dried by heating at 100° C. under nitrogen for 30 minutes. After this process of baking out the reactor, 3 g of SDMAO (supported methylaluminoxane) (for sd-Cat1 only used 5 g of SDMAO) was introduced as a scavenger under nitrogen pressure. After adding SDMAO, the reactor was sealed and components were stirred. The reactor was then charged with hydrogen and 1-hexene pressurized with ethylene. Once the system reached a steady state, the catalyst was charged into the reactor at 80° C. to start polymerization. The reactor temperature was brought to the desired reaction temperature and maintained at this temperature, and at the ethylene, 1-hexene, and hydrogen feed ratios throughout the 1 hour run. At the end of the run, the reactor was cooled down, vented and opened. The resulting product mixture was washed with water and methanol, then dried. Polymerization productivity (grams polymer/gram catalyst-hour) was determined as the ratio of polymer produced to the amount of catalyst added to the reactor.

Production of Polyethylene

The reaction conditions used for each run are reported in Tables 2, 4, and 6. The reactor data for each run are reported in Table 4. The properties of the poly(ethylene-co-1-hexene) copolymer (ethylene-based copolymer) produced by each run are reported in Tables 3, 5, and 7.

TABLE 2

Batch Gas-Phase Reactor Conditions for sd-Cat1.

| Ex No. | Catalyst | Temp. (° C.) | $C_6/C_2$ molar ratio | $H_2/C_2$ molar ratio | $C_2$ partial press. (Kpa) | Catalyst charge (mg) | Copol. Yield (g) | Cat. Product. (gPE/gcat/hr) |
|---|---|---|---|---|---|---|---|---|
| 1 | sd-Cat1 | 90 | 0.002 | 0.007 | 1590 | 10.5 | 41.33 | 3936 |
| 2 | sd-Cat1 | 90 | 0.002 | 0.01 | 1590 | 10.8 | 30.59 | 2833 |
| 3 | sd-Cat1 | 90 | 0.002 | 0.05 | 1590 | 10.5 | 40.60 | 3866 |
| 4 | sd-Cat1 | 90 | 0.001 | 0.01 | 1590 | 10.4 | 95.40 | 9173 |
| 5 | sd-Cat1 | 90 | 0.002 | 0.01 | 1380 | 10.0 | 40.36 | 4036 |

TABLE 3

Properties of poly(ethylene-co-1-alkene) copolymers made with sd-Cat1 in gas phase polymerization batch reactor (refer to Table 1).

| Ex No. | $M_n$ (g/mol) | $M_w$ (g/mol) | $M_w/M_n$ | Wt % $C_6$ | SCB/1000TC | MWCDI |
|---|---|---|---|---|---|---|
| 1 | 445,489 | 1,119,443 | 2.51 | 5.32 | 8.86 | 0.65 |
| 2 | 384,605 | 1,093,605 | 2.84 | 5.53 | 9.22 | 0.23 |
| 3 | 101,477 | 260,644 | 2.57 | 4.67 | 7.79 | 0.79 |
| 4 | 273,551 | 770,470 | 2.82 | 1.75 | 2.92 | 0.89 |
| 5 | 312,221 | 883,194 | 2.83 | 5.52 | 9.20 | 1.30 |

TABLE 4

Batch Gas-Phase Reactor Conditions for sd-Cat2-sd-Cat4.

| Ex No. | Catalyst | Temp. (° C.) | $C_6/C_2$ molar ratio | $H_2/C_2$ molar ratio | $C_2$ partial press. (Kpa) | Catalyst charge (mg) | Copol. Yield (g) | Cat. Product. (gPE/gcat/hr) |
|---|---|---|---|---|---|---|---|---|
| 6 | sd-Cat2 | 90 | 0.003 | 0.004 | 689 | 6 | 119.80 | 19967 |
| 7 | sd-Cat2 | 100 | 0.004 | 0.0068 | 1586 | 6.6 | 203.00 | 30757 |
| 8 | sd-Cat2 | 90 | 0.016 | 0.0011 | 1517 | 6 | 163.00 | 27166 |
| 9 | sd-Cat2 | 101 | 0.002 | 0.07 | 1586 | 3.3 | 116.60 | 35332 |
| 10 | sd-Cat2 | 102 | 0.006 | 0.07 | 1517 | 3.4 | 238.40 | 70293 |

TABLE 4-continued

Batch Gas-Phase Reactor Conditions for sd-Cat2-sd-Cat4.

| Ex No. | Catalyst | Temp. (° C.) | $C_6/C_2$ molar ratio | $H_2/C_2$ molar ratio | $C_2$ partial press. (Kpa) | Catalyst charge (mg) | Copol. Yield (g) | Cat. Product. (gPE/gcat/hr) |
|---|---|---|---|---|---|---|---|---|
| 11 | sd-Cat3 | 100 | 0.004 | 0.0068 | 1586 | 6.2 | 105.60 | 17032 |
| 12 | sd-Cat4 | 100 | 0.004 | 0.0068 | 1586 | 6.1 | 207.00 | 33934 |
| 13 | sd-Cat4 | 90 | 0.016 | 0.0011 | 1517 | 6.4 | 111.40 | 17406 |

TABLE 5

Properties of ethylene-based copolymers made with sd-Cat1-sd-Cat4 in gas phase polymerization batch reactor detailed in Table 4

| Ex No. | $M_n$ (g/mol) | $M_w$ (g/mol) | $M_w/M_n$ | Wt % $C_6$ | SCB/ 1000TC | MWCDI |
|---|---|---|---|---|---|---|
| 6 | 1,805,242 | 4,061,353 | 2.25 | 8.08 | 13.47 | 1.58 |
| 7 | 1,316,183 | 3,510,257 | 2.67 | 7.95 | 13.26 | 1.33 |
| 8 | 1,308,074 | 4,015,719 | 3.07 | 24.56 | 40.93 | 1.56 |
| 9 | 497,315 | 1,542,405 | 3.10 | 3.22 | 5.37 | 0.97 |
| 10 | 847,802 | 2,027,218 | 2.39 | 8.19 | 13.66 | 1.33 |
| 11 | 726,631 | 1,785,436 | 2.46 | 3.72 | 6.19 | 0.15 |
| 12 | 363,211 | 1,095,006 | 3.01 | 4.13 | 6.89 | 0.76 |
| 13 | 500,045 | 1,985,408 | 3.97 | 22.70 | 37.84 | 4.37 |

TABLE 6

Batch Gas-Phase Reactor Conditions for sd-Cat5-sd-Cat7

| Ex No. | Catalyst | Temp. (° C.) | C6/C2 molar ratio | H2/C2 molar ratio | C2 partial press. (Kpa) | Catalyst charge (mg) | Copol. Yield (g) | Cat. Product. (gPE/gcat/hr) |
|---|---|---|---|---|---|---|---|---|
| 14[a] | sd-Cat5 | 100 | 0.004 | 0.0068 | 1586 | 6.4 | 206.60 | 39367 |
| 15[b] | sd-Cat6 | 100 | 0.004 | 0.0068 | 1586 | 6 | 247.40 | 51541 |
| 16 | sd-Cat6 | 90 | 0.003 | 0.004 | 689 | 3.3 | 54.59 | 16543 |
| 17 | sd-Cat7 | 90 | 0.003 | 0.004 | 689 | 3.4 | 21.40 | 6293 |
| 18 | sd-Cat7 | 100 | 0.004 | 0.0068 | 1586 | 3.1 | 90.39 | 29159 |

[a]Run time for Ex. No. 12 was 0.82 h. [b]Run time for Ex. No. 13 was 0.80 h.

TABLE 7

Properties of ethylene-based copolymers made with sd-Cat5-sd-Cat7 in gas phase polymerization batch reactor detailed in Table 6.

| Ex No. | Mn (g/mol) | Mw (g/mol) | Mw/Mn | Wt % C6 | SCB/ 1000TC | MWCDI |
|---|---|---|---|---|---|---|
| 14 | 548,507 | 1,387,726 | 2.53 | 7.49 | 12.49 | 0.47 |
| 15 | 553,605 | 1,336,585 | 2.41 | 4.36 | 7.26 | 0.91 |
| 16 | 990,584 | 2,255,639 | 2.28 | 6.28 | 10.47 | 1.42 |
| 17 | 1,261,671 | 2,904,297 | 2.30 | 5.95 | 9.92 | 1.58 |
| 18 | 618,766 | 1,600,440 | 2.59 | 4.52 | 7.53 | 0.38 |

Polymers with an increase weight percent (wt %) comonomer as a function of an increase in the molecular weight (MW) of the polymer chains have improved performance in many applications. This is also referred to polymers having broad orthogonal composition distributions (BOCD). Quantitatively, a measure of the "reverse-ness" or "BOCD-ness" is the molecular weight comonomer distribution index (MWCDI). A polymer is said to be BOCD, or have a reverse comonomer distribution, if the MWCDI greater than 0, while polymers having MWCDI less than 0 are said to have normal (or Ziegler-Natta) type comonomer distributions, and when MCDWI equal to 0 the comonomer distribution is said to be flat. Certain polymer properties typically improve as the comonomer distribution goes from normal to flat to reverse.

Figure 2:
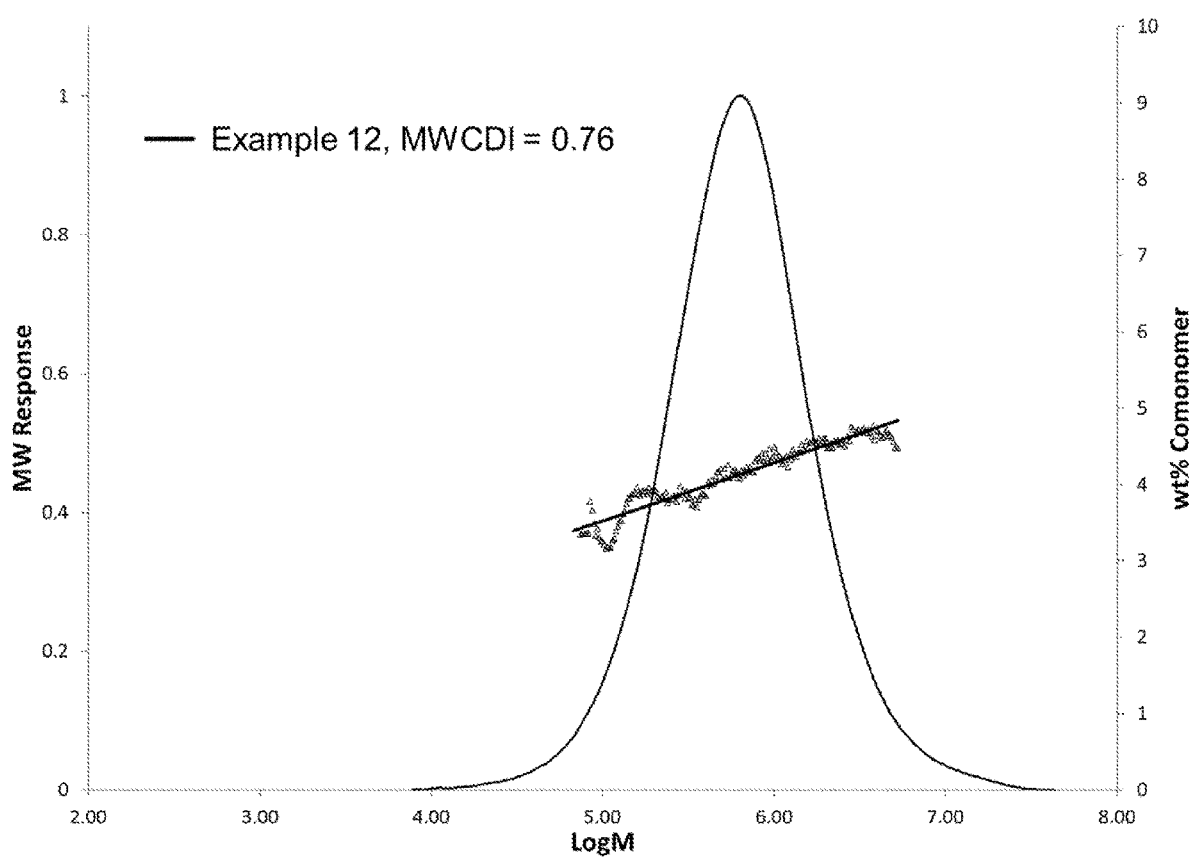
FIG. 2 is a graphical depiction of the reverse comonomer distributions and molecular weight distributions of inventive Example 12.
Figure 3:
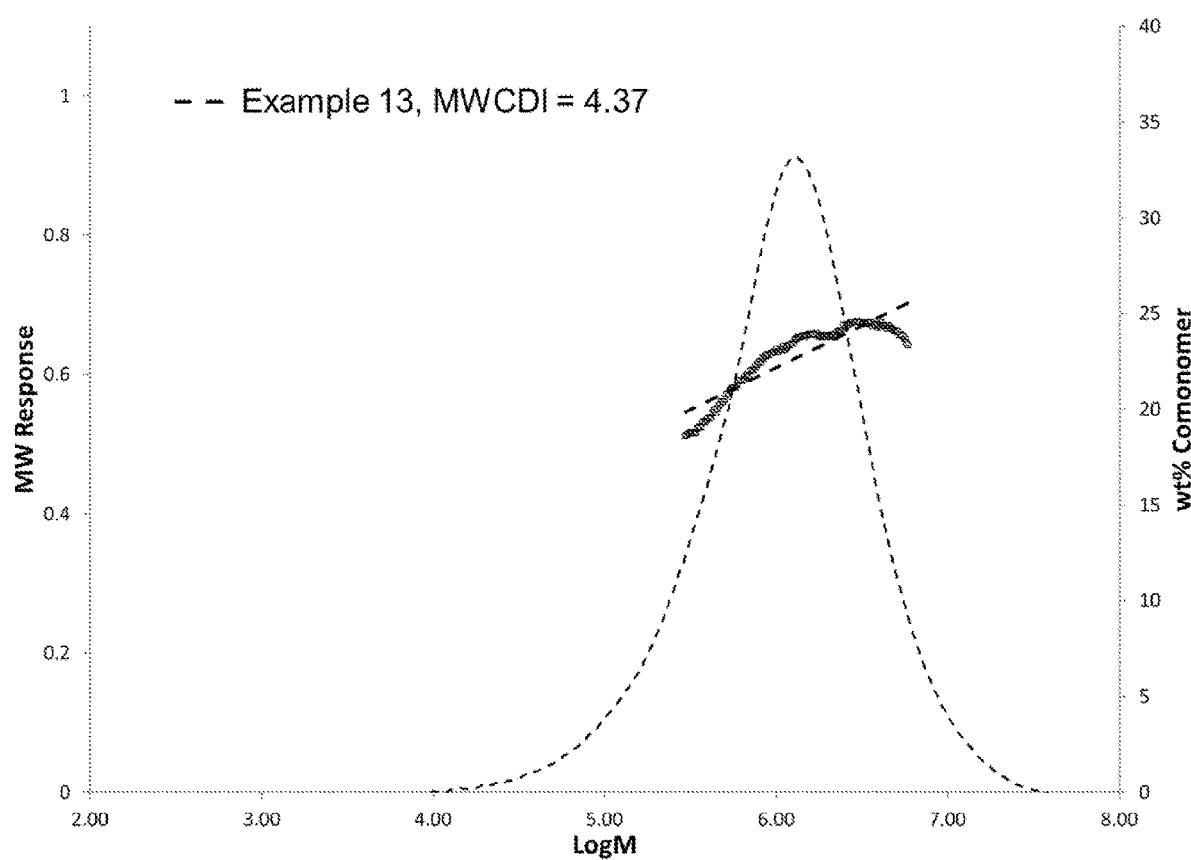
FIG. 3 is a graphical depiction of the reverse comonomer distributions and molecular weight distributions of inventive Example 13.
Figure 4:
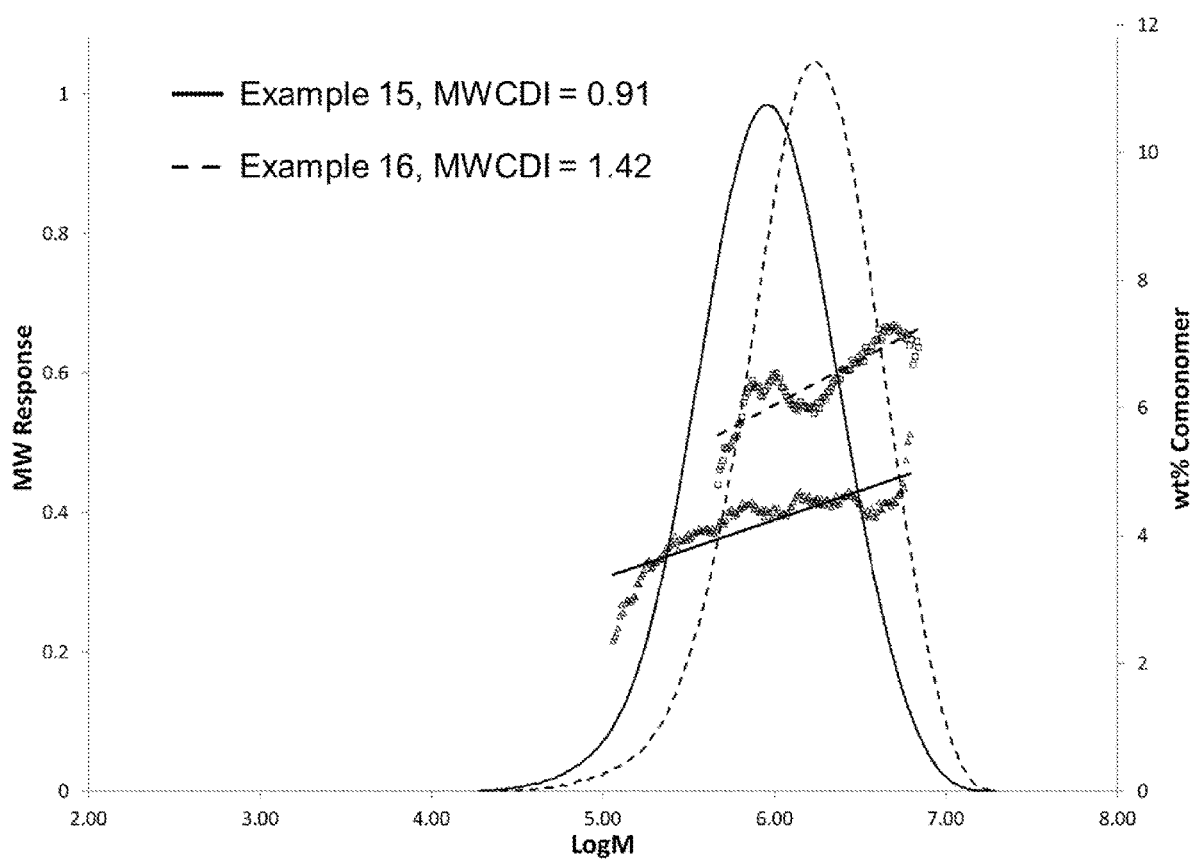
FIG. 4 is a graphical depiction of the reverse comonomer distributions and molecular weight distributions of inventive Examples 15 and 16.

Table 3 shows the ethylene-based copolymers of Examples 1 to 5 made with spray-dried catalyst sd-IC-1 in gas phase polymerization batch reactor independently have a reverse comonomer distribution and a unimodal molecular weight distribution. The molecular weight distribution (MWD) and MWCDI were determined by conventional GPC analysis previously described. The molecular weight comonomer distribution index (MWCDI) and molecular weight distributions (MWD) of inventive Examples 1 and 4 are graphically depicted in FIG. 1; Example 12 in Table 4 is depicted in FIG. 2; Example 13 in Table 4 is depicted in FIG. 3; and Examples 15 and 16 are depicted in FIG. 4. FIGS. 1 to 4 further indicate that the ethylene-based copolymer is unimodal based on the single maxima of the MWD curve. Furthermore, the MWCDI lines, as shown FIGS. 1 to 4, have a slop greater than 0, thus indicating that there is reverse comonomer incorporation.

The invention claimed is:

1. A process for producing an ethylene-based copolymer having a reverse comonomer distribution, the process comprising polymerizing ethylene and one or more ($C_3$-$C_{12}$)α-olefin comonomers in the presence a catalyst system in a single gas-phase polymerization reactor at a reactor temperature of 60° C. to less than or equal to 150° C. and a molar feed ratio of less than or equal to 0.020 of the one or more ($C_3$-$C_{12}$)α-olefin comonomers to the ethylene, wherein:

the catalyst system comprises one or more support materials and an activated metal-ligand complex having a structure according to formula (Ia):

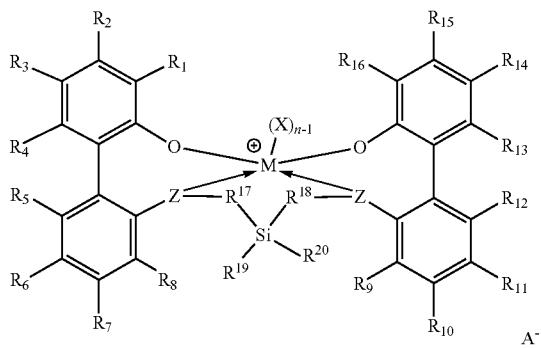

(Ia)

wherein:
A⁻ is an anion;
M is titanium, zirconium, or hafnium;
n is 1, 2, or 3;
each X is a monodentate ligand independently chosen from unsaturated $(C_2-C_{50})$hydrocarbon, unsaturated $(C_2-C_{50})$heterohydrocarbon, $(C_1-C_{50})$hydrocarbyl, $(C_1-C_{50})$heterohydrocarbyl, $(C_6-C_{50})$aryl, $(C_4-C_{50})$heteroaryl, halogen, $—N(R^N)_2$, and $—N(R^N)COR^C$;
each Z is independently chosen from —O—, —S—, $(C_6-C_{50})$aryl, $(C_4-C_{50})$heteroaryl, $N(C_1-C_{40})$hydrocarbyl, and $P(C_1-C_{40})$hydrocarbyl;
$R^1$ and $R^{16}$ are independently chosen from $(C_6-C_{50})$aryl, $(C_4-C_{50})$heteroaryl, $(C_1-C_{40})$alkyl, $(C_3-C_{40})$heteroalkyl, radicals having formula (II), radicals having formula (III), and radicals having formula (IV):

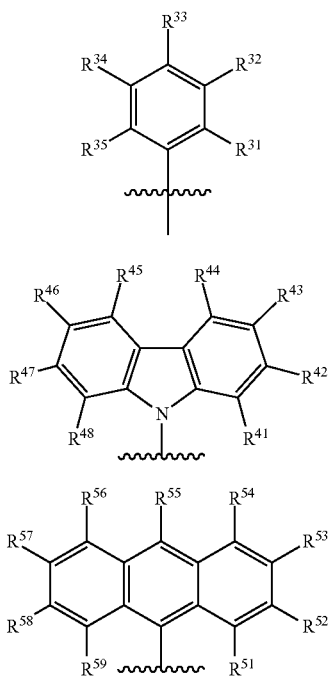

wherein $R^{31-35}$, $R^{41-48}$, and $R^{51-59}$ are independently chosen from —H, $(C_1-C_{50})$hydrocarbyl, $(C_1-C_{50})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C=N—$, $R^CC(O)O—$, $R^COC(O)—$, $R^CC(O)N(R^N)—$, $(R^C)_2NC(O)—$, or halogen;

$R^2$, $R^3$, $R^4$, $R^5$, $R^6$, $R^7$, $R^8$, $R^9$, $R^{10}$, $R^{11}$, $R^{12}$, $R^{13}$, $R^{14}$, and $R^{15}$ are independently chosen from —H, $(C_1-C_{50})$hydrocarbyl, $(C_1-C_{50})$heterohydrocarbyl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, and halogen;

$R^{17}$ and $R^{18}$ are independently chosen from $—(CR^C_2)_m—$, wherein subscript m is from 1 to 10;

$R^{19}$ and $R^{20}$ are independently chosen from linear or branched $(C_1-C_{20})$alkyl; and each $R^C$, $R^P$, and $R^N$ are independently chosen from —H, $(C_1-C_{50})$hydrocarbyl, and $(C_1-C_{50})$heterohydrocarbyl; and the ethylene-based copolymer has a unimodal molecular weight distribution as determined by gel permeation chromatography (GPC) and a molecular weight comonomer distribution index of greater than 0 as determined by determined by rapid Fourier Transform-Infrared (FT-IR) spectroscopy on dissolved copolymer during the gel permeation chromatography (GPC) measurement.

2. The process of claim 1, wherein $R^1$ and $R^{16}$ are the same.

3. The process of claim 1, wherein at least one of $R^1$ and $R^{16}$ is a radical having formula (II) and at least one of $R^{32}$ and $R^{34}$ is tert-butyl.

4. The process of claim 1, wherein at least one of $R^1$ and $R^{16}$ is a radical having formula (III).

5. The process of claim 4, wherein at least one of $R^{42}$, $R^{43}$, $R^{46}$, and $R^{47}$ is tert-butyl.

6. The process of claim 5, wherein $R^{41-48}$ are —H.

7. The process of claim 1, wherein the one or more support materials comprise fumed silica.

8. The process of claim 1, wherein the catalyst system comprises spray-dried particles.

9. The process of claim 1, wherein the process produces greater than or equal to 2,500 grams of the ethylene-based copolymer per gram of the catalyst system per hour.

10. The process of claim 1, wherein a ratio of a weight average molecular weight of the ethylene-based copolymer to weight percent comonomer content of the ethylene-based copolymer is greater than or equal to 10,000; or wherein a ratio of a weight average molecular weight of the ethylene-based copolymer to weight percent comonomer content of the ethylene-based copolymer is greater than or equal to 20,000; or wherein a ratio of a weight average molecular weight of the ethylene-based copolymer to weight percent comonomer content of the ethylene-based copolymer is greater than or equal to 30,000.

11. The process of claim 1, wherein the catalyst system further comprises one or more activators.

12. The process of claim 11, wherein the one or more activators comprises methylalumoxane (MAO).

13. The process of claim 1, wherein the catalyst system is fed to the gas-phase polymerization reactor in neat form, as a solution, as a slurry, or a combination thereof.

14. The process of claim 1, wherein the reactor temperature is less than or equal to 120° C.; or wherein the reactor temperature is 75° C. to 105° C.; or wherein the reactor temperature is 80° C. to 100° C.; or wherein the reactor temperature is 85° C. to 95° C.

15. The process of claim 1, wherein the molecular weight of the ethylene-based copolymer is greater than 200,000 g/mol; or wherein the ethylene-based copolymer comprises a molecular weight of greater than 500,000 g/mol.

16. The process of claim 1, wherein the ethylene-based copolymer further comprises a comonomer incorporation of less than 30 wt. % as determined by Rapid FT-IR spectroscopy on dissolved polymer of a GPC measurement.

17. A process for producing an ethylene-based copolymer having a reverse comonomer distribution, the process comprising polymerizing ethylene and one or more $(C_3-C_{12})\alpha$-olefin comonomers in the presence a catalyst system in a single gas-phase polymerization reactor at a reactor temperature of less than or equal to 150° C. and a molar feed ratio of less than or equal to 0.020 of the one or more $(C_3-C_{12})\alpha$-olefin comonomers to the ethylene, wherein:

the catalyst system comprises an activated metal-ligand complex having a Group IV metal center and at least one dianionic heterohydrocarbyl ligand and one or more monoanionic hydrocarbyl ligand provided that the ligand is not cyclopentadienyl; wherein the catalyst system does not contain a support material; and the ethylene-based copolymer has a unimodal molecular weight distribution and a molecular weight comonomer distribution index of greater than 0.

* * * * *